United States Patent
Nolan et al.

(10) Patent No.: US 10,644,961 B2
(45) Date of Patent: May 5, 2020

(54) SELF-ADJUSTING DATA PROCESSING SYSTEM

(71) Applicant: INTEL CORPORATION, Santa Clara, CA (US)

(72) Inventors: Keith Nolan, Mullingar (IE); Mark Kelly, Leixlip (IE); Michael Nolan, Maynooth (IE); Pat Cheevers, Dublin (IE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/870,684

(22) Filed: Jan. 12, 2018

(65) Prior Publication Data

US 2019/0044818 A1 Feb. 7, 2019

(51) Int. Cl.
| | |
|---|---|
| *H04L 12/24* | (2006.01) |
| *H04W 8/00* | (2009.01) |
| *H04L 12/26* | (2006.01) |
| *G06F 16/245* | (2019.01) |
| *H04L 12/28* | (2006.01) |

(52) U.S. Cl.
CPC ............ *H04L 41/12* (2013.01); *G06F 16/245* (2019.01); *H04L 41/0654* (2013.01); *H04L 43/0876* (2013.01); *H04W 8/005* (2013.01); *H04L 12/2803* (2013.01); *H04L 43/08* (2013.01)

(58) Field of Classification Search
None
See application file for complete search history.

(56) References Cited

U.S. PATENT DOCUMENTS

| | | |
|---|---|---|
| 6,173,323 B1 | 1/2001 | Moghe |
| 8,443,072 B1 | 5/2013 | Orbach |
| 8,588,245 B2 | 11/2013 | Julien et al. |

(Continued)

FOREIGN PATENT DOCUMENTS

| | | |
|---|---|---|
| WO | 2015083919 A1 | 6/2015 |
| WO | 2015150853 A1 | 10/2015 |
| WO | 2017215756 A1 | 12/2017 |

OTHER PUBLICATIONS

Tahir et al., "Symbiot: Congestion-driven Multi-resource Fairness for Muli-User Sensor Networks", 2015 IEEE HPCC-CSS-ICESS, Aug. 24-26, 2015, 6 pages.

(Continued)

*Primary Examiner* — Anh Ngoc M Nguyen
(74) *Attorney, Agent, or Firm* — International IP Law Group, P.L.L.C.

(57) ABSTRACT

A method and apparatus for self-adjusting networks including internet-of-things (IoT) devices is provided. An exemplary system includes a source discovery system configured to identify if a source sending a message is in a database, and, if not, add the source to the database and rank the source by link metrics of messages received from the source. A sink discovery system is configured to identify if a sink receiving a message is in a database, and, if not, add the sink to the database. The sink discovery system is configured to rank the sink by link metrics of messages responded to by the sink. A dynamic mapping system is configured to create a dynamic map of communications between a source and a sink, and implement a self-healing subsystem to restore a loss of communications between a source and a sink.

25 Claims, 14 Drawing Sheets

(56) References Cited

U.S. PATENT DOCUMENTS

| | | | |
|---|---|---|---|
| 9,241,451 B2 | 1/2016 | Ersavas et al. | |
| 9,294,476 B1 | 3/2016 | Lurey et al. | |
| 9,699,069 B1 | 7/2017 | Kielhofner et al. | |
| 2007/0008884 A1 | 1/2007 | Tang | |
| 2007/0291646 A1 | 12/2007 | Ohishi et al. | |
| 2011/0134936 A1 | 6/2011 | Andreoli-Fang et al. | |
| 2011/0310743 A1 | 12/2011 | Kuriyan | |
| 2012/0099587 A1* | 4/2012 | Fan | H04W 40/16 370/389 |
| 2012/0317308 A1 | 12/2012 | Penner et al. | |
| 2013/0246944 A1 | 9/2013 | Pandiyan et al. | |
| 2014/0095170 A1 | 4/2014 | Roper et al. | |
| 2014/0126362 A1 | 5/2014 | Ogura | |
| 2014/0286164 A1 | 9/2014 | Mahindra et al. | |
| 2014/0304436 A1 | 10/2014 | Mortensen et al. | |
| 2014/0337435 A1 | 11/2014 | Kaefer et al. | |
| 2015/0039328 A1* | 2/2015 | MacKenzie | G06Q 50/22 705/2 |
| 2015/0098374 A1 | 4/2015 | Homchaudhuri et al. | |
| 2015/0134954 A1 | 5/2015 | Walley et al. | |
| 2015/0195738 A1 | 7/2015 | Zhu et al. | |
| 2016/0041534 A1 | 2/2016 | Gupta | |
| 2016/0117162 A1 | 4/2016 | Searle et al. | |
| 2016/0296124 A1 | 10/2016 | Wegerich et al. | |
| 2016/0321480 A1 | 11/2016 | Hamlin et al. | |
| 2016/0340856 A1 | 11/2016 | Conner et al. | |
| 2016/0342328 A1 | 11/2016 | Rangarajan et al. | |
| 2017/0111328 A1 | 4/2017 | Leon | |
| 2017/0187588 A1 | 6/2017 | Nolan et al. | |
| 2017/0187597 A1 | 6/2017 | Nolan et al. | |
| 2017/0187625 A1 | 6/2017 | Nolan et al. | |
| 2017/0187642 A1 | 6/2017 | Nolan et al. | |
| 2017/0195136 A1 | 7/2017 | Ghosh et al. | |
| 2018/0020389 A1* | 1/2018 | Abdallah | H04B 7/0617 |

OTHER PUBLICATIONS

PCT International Search Report, PCT Application No. PCT/US2016/063907, dated Mar. 9, 2017, 3 pages.

PCT International Search Report, PCT Application No. PCT/US2016/063908, dated Mar. 8, 2017, 3 pages.

PCT International Search Report, PCT Application No. PCT/US2016/063909, dated Mar. 7, 2017, 3 pages.

International Search Report for related PCT Application Serial No. PCT/US2018/064733 dated Mar. 25, 2019, 3 pages.

* cited by examiner

Welcome    Statistics    Device Overview    Health Check    Watch    Reports    Load    Cache    Validate    White List    API    Time Series Data

UDP    🔍

| Group | Type | End Point | Topic/Port | Sink | Running Total | Previous Pulse Average | Last Time | Peak | Peak Time | Last Message | Stop/Start |
|---|---|---|---|---|---|---|---|---|---|---|---|
| TCHECK | OBS | UDP | 3333 | KAIROS | 25 | 1 | 12/05/2015 06:38:13 | 1 | 12/05/2015 06:14:13 | {"metrics":[{"tags": [{"sender_id": | |
| TFAIL | OBS | UDP | 3333 | KAIROS | 0 | 0 | | 0 | | | |
| TSUCCESS | OBS | UDP | 3333 | KAIROS | 25 | 1 | 12/05/2015 06:38:13 | 2 | 12/05/2015 06:15:13 | 0 {"queries": [{"sample_size":"10.","r | |
| TATTEMPT | OBS | UDP | 3333 | KAIROS | 51 | 2 | 12/05/2015 06:38:43 | 2 | 12/05/2015 06:14:13 | {"data_source": [{"name","LoadDSou | ☐ |
| TCHECK | OBS | UDP | 3334 | KAIROS | 25 | 1 | 12/05/2015 06:38:13 | 1 | 12/05/2015 06:14:13 | {"metrics":[{"tags": [{"sender_id": | |
| TFAIL | OBS | UDP | 3334 | KAIROS | 0 | 0 | | 0 | | | |
| TSUCCESS | OBS | UDP | 3334 | KAIROS | 25 | 1 | 12/05/2015 06:38:13 | 1 | 12/05/2015 06:14:13 | 0 {"queries": [{"sample_size":"15.","r | |
| TATTEMPT | OBS | UDP | 3334 | KAIROS | 51 | 2 | 12/05/2015 06:38:43 | 2 | 12/05/2015 06:14:13 | {"data_source": [{"name","LoadDSou | ☐ |

SELF-ADJUSTING DATA PROCESSING SYSTEM

TECHNICAL FIELD

The present techniques relate generally to Internet of Things (IoT) devices. More specifically the present techniques relate to devices that can detect and resolve communications faults.

BACKGROUND

It has been estimated that the Internet of Things (IoT) may bring Internet connectivity to 50 billion devices by 2020. As the number of devices and complexity of Internet of Things and Fog systems increases, human intervention to identify and resolve technical issues may no longer feasible for systems needing high reliability. The complexity of these systems is due in part to multiple integrated technologies, mixed-mode workloads, for example, including sensing, decision making, fractional computation, and mixed-mobility. The reliability of the system must be continually verified. However, manual verification and operations in massive networks may not be feasible. Further, automatic methods and functions for detecting failures and modifying operations during failures are needed.

BRIEF DESCRIPTION OF THE DRAWINGS

FIG. 11 is a screen shot of a real-time visualization of endpoint status, in accordance with some examples.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION

Figure 1:
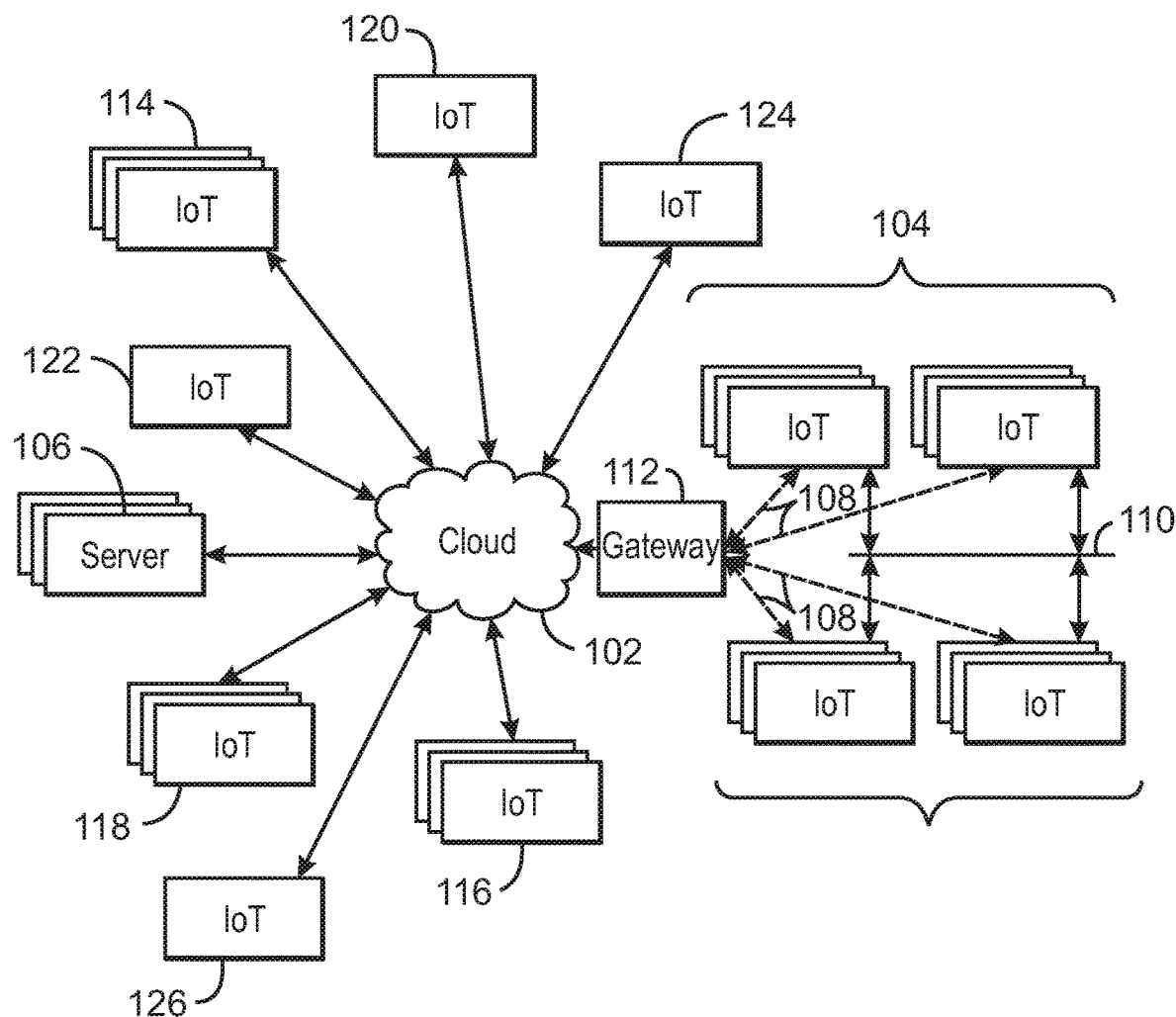
FIG. 1 is a drawing of a cloud computing network, or cloud, in communication with a number of Internet of Things (IoT) devices, in accordance with some examples.

The internet of things (IoT) is a concept in which a large number of computing devices are interconnected to each other and to the Internet to provide functionality and data acquisition at very low levels. As used herein, low level describes devices located near the edges of networks. For example, IoT networks may include commercial and home automation devices, such as water distribution systems, electric power distribution systems, pipeline control systems, plant control systems, light switches, thermostats, locks, cameras, alarms, motion sensors, and the like. These devices, termed IoT devices herein, may be accessible through remote computers, servers, and other systems, for example, to control systems or access data. Further IoT devices may include IoT gateways, used to couple other IoT devices to cloud applications and each other.

Many of these applications depend on the reliability of the compute systems to prevent loss of service or other problems. However, as noted, the complexity and number of devices makes human intervention increasing difficult. Examples described herein address this challenge by providing a configurable self-healing and alerting mechanism to identify failures in the integrated solution, while reducing down time.

A fog node, or gateway, typically provides entry points to the cloud and other fog nodes and gateways using Internet communication technologies, such as Internet transport protocols. The Internet transport protocols may include User Datagram Protocol (UDP), Publish Subscribe (pub-sub) protocols, which may include Real-time Publish Subscribe (RTPS) wire protocol, unicast protocols, and multicast or IPv6 broadcast protocols, among many others. The nodes using these protocols, including gateways, may include pub-sub brokers, Transport Control Protocol (TCP) endpoints, and RESTful endpoints, among others. The endpoints may accept different types of input payload. Further, endpoints may overlap in the types of payloads and protocols they can accept and send. For example, a gateway may accept a communication from an endpoint, such as a fog device, and translate the payload into a different protocol before transmitting it to a device in a cloud, such as an Internet server.

In examples described herein, a virtual payload may be dynamically generated on a regular basis, and sent to the appropriate endpoints, such as data sources, data sinks, routers, and the like, at configurable time intervals. The results of the communication may be stored in a repository for later use. For example, the expected dynamic results may be queried against the repository for completion of communications. A complex event processing (CEP) engine may be initially be fed the expected transmit frequency of an end node. In some examples, the CEP may learn the typical transmit frequency from the data flow. If the end node fails to transmit when expected an alert may be generated, and a rule based response system may also be triggered. By continually monitoring the sink and source path performance, the system may self-heal broken paths, for example, by sending test communications over other paths, and may vary the load in order to balance, stress, and predict system bottlenecks. In some examples, the communication may include a restart command to reinitialize, or restart, a device. As the device may not be able to complete the initialization if another restart command, or other communication, arrives before the restart is finished, an exponential back-off mechanism may be used to increase the time between restart commands and other communications.

Accordingly, the system may provide a configurable self-healing and alerting mechanism to highlight failures in the integrated solution while decreasing down time. The system may also be lightweight, for example, using minimal compute and communication resources. The system may also be stateless and provide a highly scalable solution with predictable resource consumption. This may make the system useful for constrained devices.

As used herein, an edge device may be an IoT gateway in communication with a number of IoT devices and with servers, or other devices, in a computing cloud. In some embodiments, the edge device may be an IoT device that is directly in communication with the computing cloud. Further, a computing cloud, or cloud, includes mobile phone systems, internet service providers, routers, networks, servers, and other units that transfer or consume data. The alerts can also be consumed and acted upon by any interested party, for example a pipeline statistics consumer, a CEP, or a rules engine for implementing communications changes to contact devices.

FIG. 1 is a drawing of a cloud computing network, or cloud 102, in communication with a number of Internet of Things (IoT) devices, in accordance with some examples. The cloud 102 may represent the Internet, or may be a local area network (LAN), or a wide area network (WAN), such as a proprietary network for a company or government entity. The IoT devices may include any number of different types of devices, grouped in various combinations. For example, a traffic control group 104 may include IoT devices along streets in a city. These IoT devices may include parking meters, stoplights, traffic flow monitors, cameras, weather sensors, and the like. The traffic control group 104, or other subgroups, may be in communication with the cloud 102, and devices in the cloud, such as cloud servers 106, through wireless links 108, such as low power wide area (LPWA) links, and the like. Further, a wired or wireless sub-network 110 may allow the IoT devices to communicate with each other, such as through a local area network, a wireless local area network, and the like. The IoT devices may use another device, such as a gateway 112 to communicate with the cloud 102.

Other groups of IoT devices may include remote weather stations 114, local information terminals 116, user carried devices 118, automated teller machines 120, alarm panels 122, or moving vehicles, such as emergency vehicles 124 or other vehicles 126, among many others. Each of these IoT devices may be in communication with other IoT devices, with servers 106, or both.

As can be seen from FIG. 1, a large number of IoT devices may be communicating through the cloud 102. This may allow different IoT devices to request or provide information to other devices autonomously. For example, the traffic control group 104 may request a current weather forecast from a group of remote weather stations 114, which may provide the forecast without human intervention. The traffic control group 104 may include payment systems, such as a distributed e-wallet, in which shares of the e-wallet are held by a number of the IoT devices in the traffic control group 104. For example, the funds from the distributed e-wallet may be used to pay for the current weather forecast from the remote weather stations 114 automatically.

As another example, the traffic control group 104 may include parking meters along a street. The parking meters may accept payment from e-wallets, or other payment methods, in user carried devices 118. The parking meters may also be instructed by the traffic control group 104 not to allow parking along the street, for example, if a weather forecast from the remote weather stations 114 indicates that a snowstorm is imminent. Accordingly, communications between devices may be important to functionality of the IoT system 100. For example, an IoT device holding an e-wallet may be in a sleep state, such as due to a low battery condition. Wake-up signals may not be recognized immediately and repeated wakeup signals may retrigger initialization before previous initializations are completed. Further, communications may develop faults, for example, due to weather conditions, failed equipment, and the like. Other paths between the IoT devices may allow communications. The techniques described herein allow for the selection of a next best path, or automatic re-initialization methods, to regain communications between units.

Clusters of IoT devices, such as the remote weather stations 114 or the traffic control group 104, may be equipped to communicate with other IoT devices as well as with the cloud 102. This may allow the IoT devices to form an ad-hoc network between the devices, allowing them to function as a single device, which may be termed a fog device. The fog device is discussed further with respect to FIG. 2.

Figure 2:
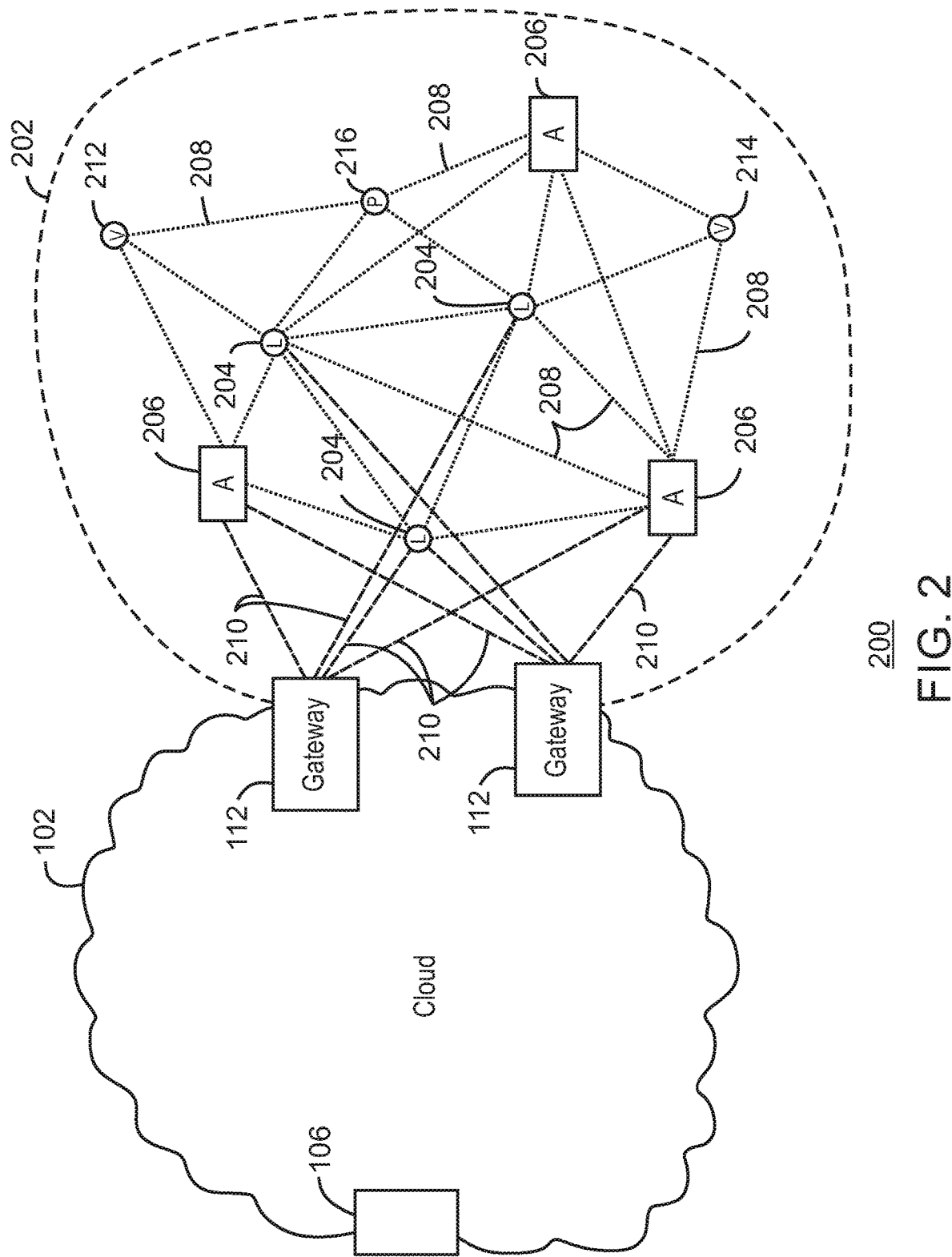
FIG. 2 is a drawing of a cloud computing network, or cloud, in communication with a mesh network of IoT devices, which may be termed a fog device, operating at the edge of the cloud, in accordance with some examples.

FIG. 2 is a drawing 200 of a cloud computing network, or cloud 102, in communication with a mesh network of IoT devices, which may be termed a fog device 202, operating at the edge of the cloud 102, in accordance with some examples. As used herein, a fog device 202 is a cluster of devices that may be grouped to perform a specific function, such as traffic control, weather control, plant control, and the like.

In this example, the fog device 202 includes a group of IoT devices at a traffic intersection and along a street. The fog device 202 may be established in accordance with specifications released by the OpenFog Consortium (OFC), among others. These specifications allow the formation of a hierarchy of computing elements between the gateways 112, or fog nodes, coupling the fog device 202 to the cloud 102 and to endpoint devices, such as traffic lights 204 and data aggregators 206 in this example. The fog device 202 can leverage the combined processing and network resources that the collective of IoT devices provides. Accordingly, a fog device 202 may be used for any number of applications including, for example, financial modeling, weather forecasting, traffic analyses, and the like.

For example, traffic flow through the intersection may be controlled by traffic lights 204, such as the three traffic lights 204 in this example. Analysis of the traffic flow and control schemes may be implemented by the data aggregators 206, which are in communication with the traffic lights 204 and each other through a mesh network. Parking, for example, near the intersection, may be controlled by parking meters in the fog device 208.

Data may be uploaded to the cloud 102, and commands received from the cloud 102, through gateways 112, or fog nodes, that are in communication with the traffic lights 204 and the aggregators 206 through the mesh network. Techniques described herein for self-healing systems may be implemented in the gateways 112, the aggregators 206, or in any other combinations of the individual devices in the fog device 202 or the cloud 102.

Any number of communications links may be used in the fog device 202. Shorter-range links 208, for example, compatible with IEEE 802.15.4 may provide local communications between IoT devices that are proximate to the intersection. Longer-range links 210, for example, compatible with LPWA standards, may provide communications between the IoT devices and the gateways 112. To simplify the diagram, not every communication link 208 or 210 is labeled with a reference number.

The fog device 202 may be considered to be a massively interconnected network wherein a number of IoT devices are in communications with each other, for example, by the communication links 208 and 210. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection and interoperability protocols may also be used, including, for example, the Open Platform Communications (OPC) Unified Architecture released in 2008 by the OPC Foundation, the AllJoyn protocol from the AllSeen alliance, the optimized link state routing (OLSR) Protocol, or the better approach to mobile ad-hoc networking (B.A.T.M.A.N.), among many others.

Communications from one IoT device may be passed along the most convenient path to reach the gateways 112, for example, the path having the fewest number of intermediate hops, or the highest bandwidth, among others. In these networks, the number of interconnections provide substantial redundancy, allowing communications to be maintained, even with the loss of a number of IoT devices. The techniques described herein provide a system for selecting alternate paths in the event of a communications loss between IoT devices.

The fog device 202 may include temporary IoT devices that are not permanent members of the fog device 202. For example, in the example system 200, three transient IoT devices have joined the fog device 202, a first vehicle 212, a second vehicle 214, and a pedestrian 216. In these cases, the IoT device may be built into the vehicles 212 and 214, or may be an app on a smart phone carried by the pedestrian 216. Other IoT devices may also be present, such as IoT devices in bicycle computers, motorcycle computers, drones, and the like. Remotely located devices, such as a remote weather station or remote payment system, may also be temporarily incorporated into the IoT device.

The fog device 202 formed from the IoT devices may be presented to clients in the cloud 102, such as the cloud server 104, as a single device, or server, located at the edge of the cloud 102, for example, through one of the gateways 112 acting as a fog node. As used herein, a server may be any individual device, virtual device, or cloud device, that provides information, control, provisioning, or other services to other devices. In this example, the control communications to specific resources in the fog device 202 may occur without identifying any specific IoT device within the fog device 202, which may be acting as a fog server. Further, the cloud server 104 may be a specific device, a virtualized device, or another fog device.

Accordingly, if one IoT device within the fog device 202 fails, other IoT devices in the fog device 202, acting as fog server nodes, may be able to discover and control a resource, such as an actuator, or other device attached to an IoT device. For example, the traffic lights 204 may be wired to allow any one of the traffic lights 204 to control lights for the other traffic lights 204. The aggregators 206 may also provide redundancy in the control of the traffic lights 204 and other functions of the fog device 202, for example, acting as local fog servers. Self-healing techniques described herein may be used to restore function or communications if an IoT device fails or loses communication.

In some examples, the IoT devices may be configured using an imperative programming style, for example, with each IoT device having a specific function and communication partners. However, the IoT devices forming the fog device 202 may be configured in a declarative programming style, allowing the IoT devices to reconfigure their operations and communications, such as to determine needed resources in response to conditions, queries, and device failures. This may be performed as transient IoT devices, such as the pedestrian 218, join the fog device 202.

As the pedestrian 216 is likely to travel more slowly than the vehicles 212 and 214, the fog device 202 may reconfigure itself to ensure that the pedestrian 216 has sufficient time to make it through the intersection. This may be performed by forming a temporary group of the vehicles 212 and 214 and the pedestrian 216 to control the traffic lights 204. If one of the vehicles 212 or 214 are autonomous, the temporary group may instruct the vehicles to slow down prior to the traffic lights 204. Further, if all of the vehicles at the intersection are autonomous, the need for traffic signals may be diminished since autonomous vehicles' collision avoidance systems may allow for highly inter-leaved traffic patterns that may be too complex for traffic lights to manage. However, traffic lights 204 may still be important for the pedestrian 216, cyclists, or non-autonomous vehicles.

As the transient devices 212, 214, and 216, leave the vicinity of the intersection the fog device 202, the fog device 202 may reconfigure itself to eliminate those IoT devices from the network. As other transient IoT devices approach the intersection, the fog device 202 may reconfigure itself to include those devices.

The fog device 202 may include the traffic lights 204 for a number of intersections, such as along a street, along with all of the transient IoT devices along the street. The fog device 202 may then divide itself into functional units, such as the traffic lights 204 and other IoT devices proximate to a single intersection. This type of combination may enable the formation of larger IoT constructs, for example, groups of IoT devices that perform a particular function, in the fog device 202. Further, if a weather forecast indicates bad conditions along the entire section of street, the fog device 202 may prevent any parking along any section of the street, for example, by instructing parking meters to not accept payment. The parking meters may provide a visual indication that parking is not allowed, for example, flashing a red light on the parking meters in place of a display.

If an emergency vehicle joins the fog device 202, an emergency construct, which may be another, overlapping, fog device, may be created that includes all of the traffic lights 204 for the street, allowing control of the traffic flow patterns for the entire street. The emergency construct may instruct the traffic lights 204 along the street to stay red for opposing traffic and green for the emergency vehicle, expediting the passage of the emergency vehicle.

As illustrated by the fog device 202, the organic evolution of IoT networks is central to improving or maximizing the utility, availability and resiliency of IoT implementations. Further, the example indicates the usefulness of strategies for providing communications and device reliability at the edge of the network. As described herein, loss of communications between devices may trigger a self-healing approach, in which other communication paths to devices are tested to determine if communications can be reestablished. Messages may be sent to reset or re-initialize devices that have stopped responding. The messages may be repeated at widening intervals to allow a device to respond before it receives another reinitialization message.

The local identification of devices may be important in implementations, as the decentralization of identity ensures a central authority cannot be exploited to allow impersonation of objects that may exist within the IoT networks. Further, local identification lowers communication overhead and latency.

Blockchains may be used to decentralize identification and communication paths as they may provide agreement between devices regarding names, identities, and paths that are in current use. As used herein, a blockchain is a distributed database of records that is made up of data structure blocks. Further, as used herein, the term blockchain may include any one or more of other distributed ledger systems. Other distributed ledger approaches include Ethereum, Ripple, Hyperledger, Multichain, Keyless Signature Infrastructure, and the like. Each data structure block is based on a transaction, where a listing of source devices, a listing of sink devices, a listing of paths between source devices and sink devices, a payment transaction, a new name for a device, and the like, are examples of transactions.

Using blockchains for identification, impersonation may be detected by observing re-issuance of names, identities, and communication paths without a corresponding termination. Public blockchains may be most useful, as they can enable a diverse community of observers to detect misnaming, malicious naming, or failure of a naming infrastructure. Thus, trustworthy identity infrastructure may be central to trusting IoT networks. In some examples, the blockchains may be used for securing communications paths between data sources and data sinks.

Networks of devices for detecting communication failures, as described herein, may be provided in a multi-access edge computing (MEC) environment. Multi-access edge computing (MEC), also referred to as mobile edge computing, may offer application developers and content providers cloud-computing capabilities and an information technology service environment at the edge of a network. An MEC system may include an MEC orchestrator, and an MEC platform manager, which manage the provision of a service to a user equipment (UE) device, such as a device determining if communications have failed, by a service provider, through one or more access points, or one or more MEC hosts.

The MEC environment may be part of a radio access network (RAN) that has been opened to third party providers, such as clearing houses for blockchain transactions. The RAN may provide a high bandwidth, low latency system that allows fog devices 202 to function more efficiently with applications and services in the cloud 102. Accordingly, MEC may be seen as a cloud or fog server running at the edge of a mobile network and performing tasks that may not be achieved with traditional network infrastructure. Machine-to-machine gateway and control functions, such as the IoT device examples described with respect to FIGS. 1 and 2, are one example, self-adapting and self-healing systems are another. In an MEC network, processing power, such as servers, are moved closer to the edge of networks.

Examples described herein may use an MEC apparatus that may collect one or more local cost measurements to measure a local cost, or communications, between a first entity to a second entity along a path from a service provider to the device to provide the service to the device. A local cost measurement from a first entity to a second entity may represent a latency, a financial cost, or a QoS, from the first entity to the second entity. In view of the one or more local cost measurements, a cost for a MEC host to provide the service or a cost for the service provider to provide the service may be calculated. A service, such as a communications path, may be allocated to a MEC host based on an allocation policy related to a cost for the MEC host to provide the service or a cost for the service provider to provide the service.

Figure 3:
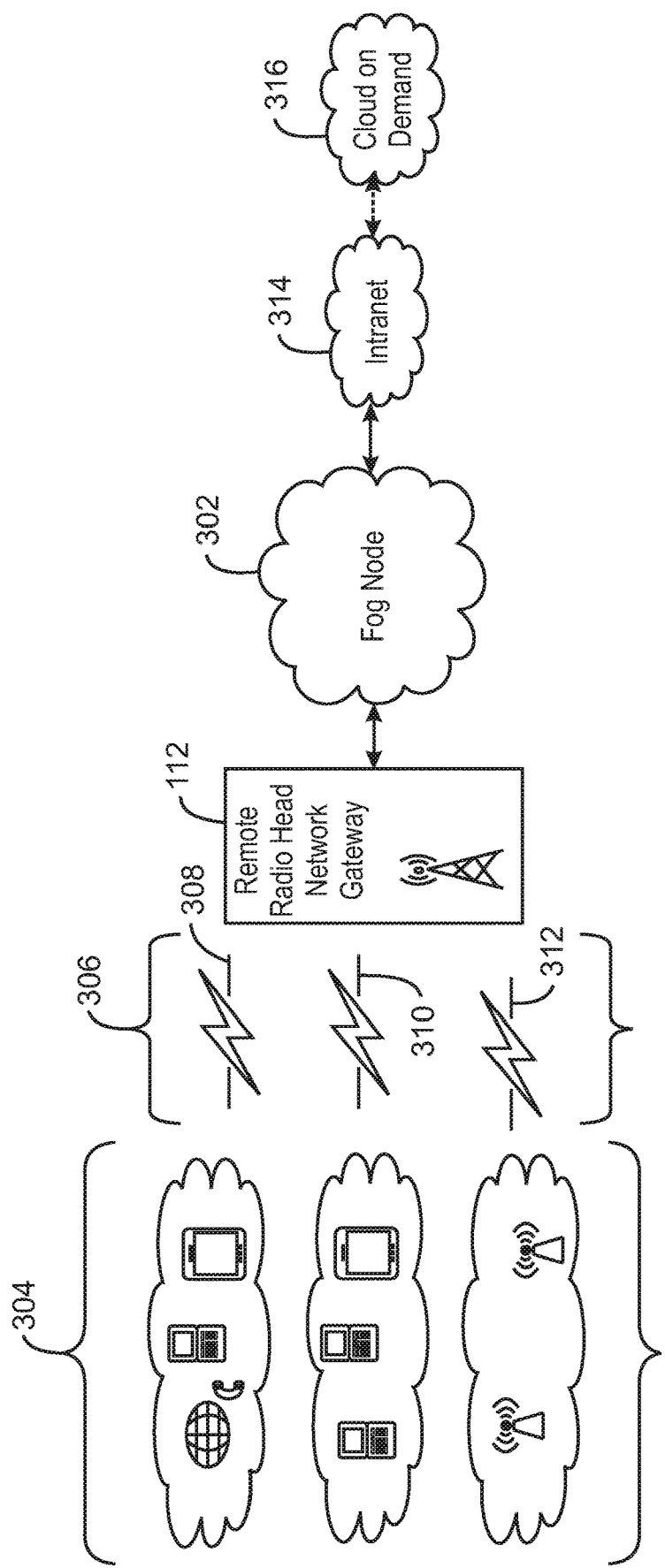
FIG. 3 is simplified schematic diagram of an end-to-end IoT system, in accordance with some examples

FIG. 3 is simplified schematic diagram of an end-to-end IoT system 300, in accordance with some examples. In the end-to-end IoT system 300, a fog node 302 may receive observations from end nodes 304, such as IoT devices, mobile devices, or aggregators, among others. The observations may be transmitted over any number of types of networks 306, such as mobile ad hoc networks 308, cellular networks 310, or Wi-Fi networks 312 that pass through a gateway 112.

The end nodes 304 may be unreliable, communicating observations only intermittently. To verify the integrity of all the components in the fog device serviced by the fog node 302, the fog node 302 may generate a dynamic load, or message, and trace its progress through the system to ensure the state of health of each path through the fog system. The fog node 302 may have the capability to dynamically generate observation messages, Images, events and control messages to typical network protocols UDP, TCP, HTTP and common publish-subscribe end points.

As used herein, the fog node 302 may be a device configured to pass communications from a network, such as an intranet 314, to the gateway 112 and return observations from the gateway 112 to the intranet 314. In some examples, the fog node 302 may be part of the gateway 112 and may represent a virtual device to the intranet 314. The intranet 314 may then communicate the observations, and control messages, to a cloud on demand system 316. The fog node 302, or device operating as the fog node 302, such as an aggregator, gateway, edge device, and the like, may store code, for example, instructions, logic, etc., executable by a processor of the fog node 302 to implement the techniques discussed herein. In addition to or in lieu of the fog node 302 implementing the communications analysis and self-healing techniques, the code may be stored and executed on other devices such as the servers in the intranet 314, the cloud on demand 316, or the end nodes 304, among others. In some examples, the communications database discussed herein is developed or built on a computing device, which may be in or remote to the end-to-end IoT system 300, and so forth. Further, the database may be a distributed datastore shared among a mesh network of IoT devices, such as the end nodes 304.

In the illustrated embodiment of FIG. 3, the end nodes 304 may be communicatively coupled to the fog node 302 via wireless connections. The wireless connection may be Wi-Fi Direct™ or via an access point router built into the gateway 112, or other wireless communication protocols. The end nodes 304 may include Wi-Fi transceivers, IEEE 802.15.4 ZigBee® transceivers, IEEE 802.11p Dedicated Short Range Communications (DSRC), LTE and LTE Device to Device (D2D) proximity services (ProSe), or any number of other transceivers as described with respect to FIG. 13. ZigBee® is a wireless networking protocol that devices may employ to connect and communicate, for example, in applications in the home, workplace, business, government entity, or public domain. Other end nodes 304 may be configured to employ Bluetooth® to couple to the gateway 112 via Bluetooth®, Bluetooth® Low Energy (BLE), and the like. Further, network administrators, or end-user devices, may be coupled to the fog node 302 via various protocols such as hypertext transfer protocol (HTTP), secure shell (SSH)/Telnet, simple network management protocol (SNMP), health monitoring pings, and so forth. Lastly, the fog node 302 may function as a gateway or interface between the end nodes 304 and servers and other devices in the intranet 314 or the cloud on demand 316.

Figure 4:
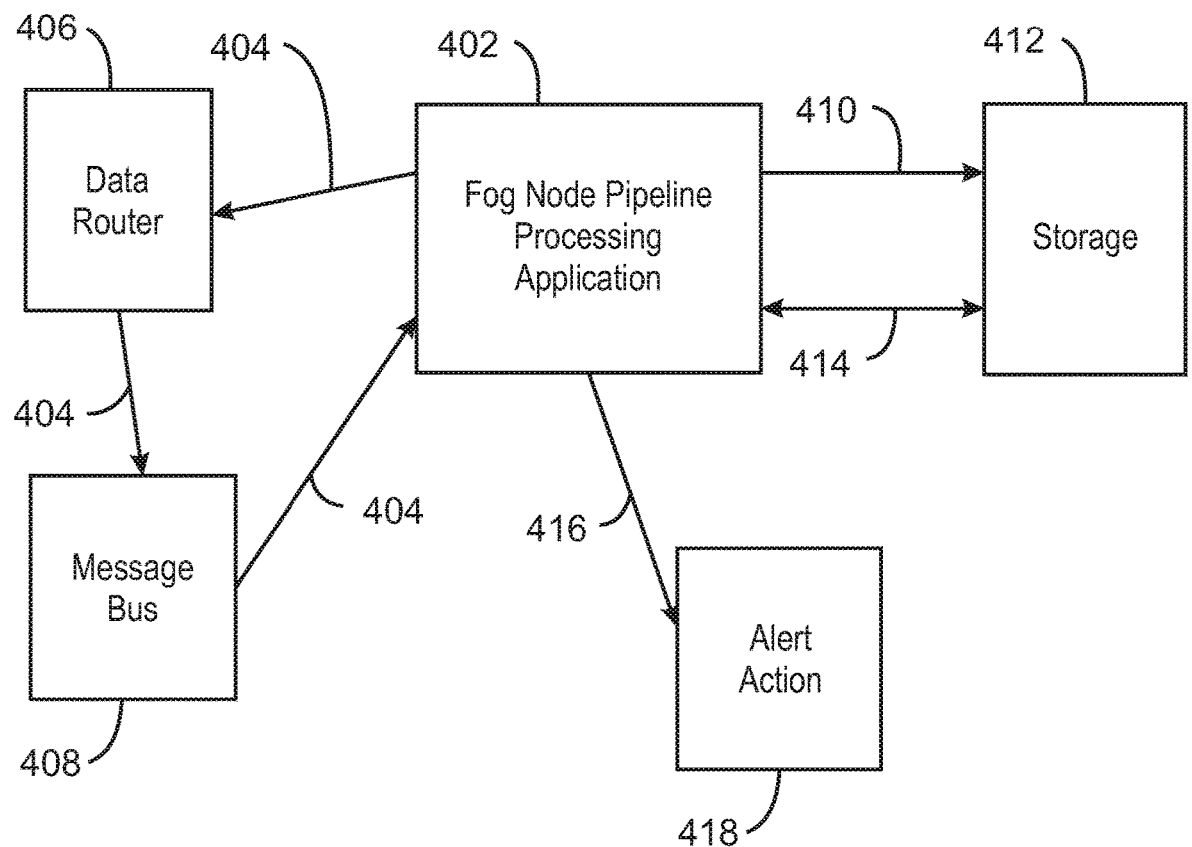
FIG. 4 is a schematic diagram of a data processing system for fog or IoT networks that is self-adjusting, in accordance with some examples.

FIG. 4 is a schematic diagram of a data processing system 400 for fog or IoT networks that is self-adjusting, in accordance with some examples. In the data processing system 400, a pipeline processing application (PPA) 402, for example, in a fog node, generates dynamic trace messages 404. The dynamic trace messages 404 are routed from the pipeline processing application 402 to endpoints, such as the edge nodes 304 described with respect to FIG. 3, or servers in the intranet 314 or cloud on demand 316.

The dynamic trace messages 404 may be sent to other devices in the data processing system 400 through data routers 406, for example, to test the operation of a message bus 408. The dynamic trace messages 404 may then be returned to the PPA 402. The PPA 402 may verify that dynamic trace messages 404 are received and then store 410 the dynamic trace messages 404, for example, in a sliding window time frame, in a storage 412. The receipt of the dynamic trace messages 404 may verify the operation of the message bus 408. The PPA 402 may also verify that end nodes have transmitted the dynamic trace messages 404 within a time frame, including a sliding window that is learned by a complex event processing (CEP) engine.

The data router 406 may enable a bi-directional edge, for example, between an IoT gateway and a cloud device. In one embodiment, a multi-protocol cloud gateway (MPCG) may act as the data router, enabling a number of protocols, such as message queuing telemetry transport (MQTT) and representational state transfer (REST).

The message bus 408 may be a publish/subscribe (pub-sub) broker. In one embodiment, Apache Kafka from the Apache Software Foundation performs this function. Data flows into the message bus 408 and may be consumed by the PPA 402 and other devices in the fog or cloud.

The storage 412 may be implemented with any number of server or cloud storage systems. In one embodiment, the storage system 412 may be implemented with OpenTSDB API on top of Cloudera. OpenTSDB may implement Telnet and REST interfaces.

The storage of the dynamic trace messages 404 may be verified by a request for dynamic trace messages 404. The PPA 402 may rank source-sink paths, for example, using link metrics, such as packet delivery ratios, uptime, and latency, among others. The PPA 402 may self-heal broken source-sink paths and modify paths based on ranking.

Any failures may be initially self-healed via an exponential back-off mechanism, for example, wherein the separation between messages is increased during a period when no return messages are received. For example, if an error occurs in communicating with the storage mechanism 412, the communicating function block will be started again, each time it consecutively fails with a growing time delay between restarts. If a severe failure has occurred, then back pressure is applied so that consumers no longer consume from the source, such as a publish subscribe (pub-sub) broker topic. The PPA 402 may send alert messages 416 to inform users, or other systems, of communication failures.

The alert messages 416 may be used to trigger alert actions 418, such as having a user check a transmitter in an IoT device, replace a battery, or investigate the causes of loss of communications.

In some examples, the PPA 402 may include subcomponents to implement the functionality, including a control user interface (UI), an automation framework, and the storage 412, which holds an anomaly or time series database. As described herein, the database may be implemented using a structured query language (SQL) datastore on a server or other device. Further, the time series database may be a distributed datastore shared across a mesh network of IoT devices, such as in a fog network. Any number of other data retrieval systems may be used for the database, including any arrangement, constraint, or hierarchy of data, so long as the needed functionality is provided to the PPA 402.

The control UI may facilitate access to configuration parameters such as the number of end nodes, message frequencies, packet sizes, burstiness of the traffic profiles, quality of service (QoS) values of Message Queuing Telemetry Transport (MQTT) based transmissions, and the like. Burstiness may refer to a sudden increase in traffic rates. For instance, a 60 second traffic profile may include 5 seconds of line rate traffic and 55 seconds of 10% bandwidth utilization. The control UI may have the ability to dynamically modify communication paths and other runtime parameters. The control UI may initiate monitoring daemons in end nodes and other devices that may be controlled via the UI. As used herein, a daemon may be a computer program that runs as a background process, rather than being under the direct control of an interactive user.

The time series database in the storage 412 may be an important component of the edge infrastructure. The time series database may hold dynamic trace messages 404, as well as communication paths, path ranking, end node configurations, results logging, and the like. As noted, the time series database may be enabled as an integrated database based on a structured query language (SQL). Most or all interactions with the time series database may be via the control UI and other implementations of the PPA 402, including implementations on other devices such as servers, in nodes, and the like. This arrangement may facilitate security and integrity of stored data. A more detail example of a data processing system 400 is described with respect to FIG. 5.

Figure 5:
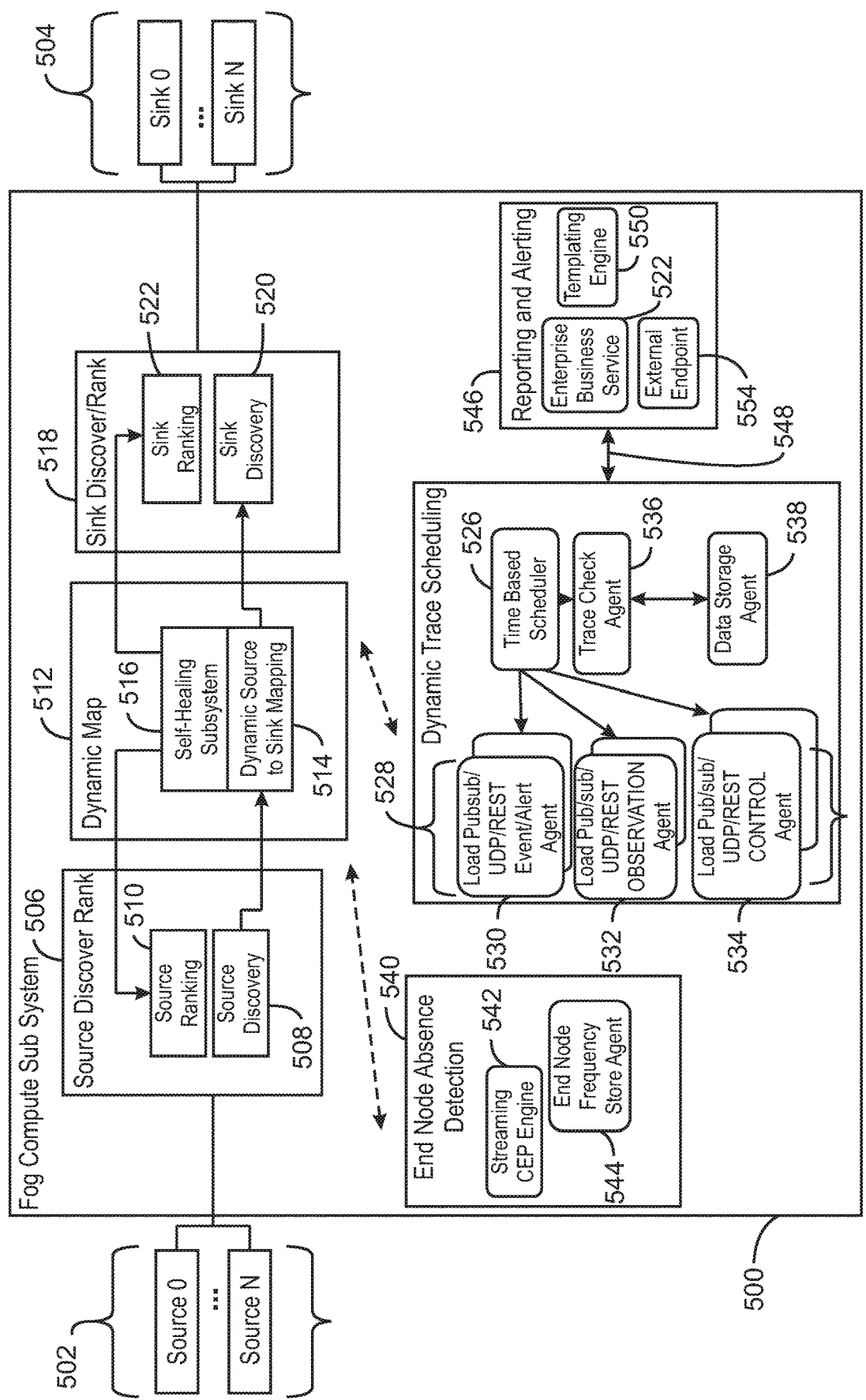
FIG. 5 is a block diagram of a self-adjusting architecture for a data processing subsystem, in accordance with some examples.

FIG. 5 is a block diagram of a self-adjusting architecture for a data processing subsystem 500, in accordance with some examples. As shown in this example, the data processing subsystem 500 may have a lightweight stateless architecture with concurrent and distributed operations, forming a resilient and scalable solution. The data processing subsystem 500 may be message driven to help ensure predictable operation with minimal resource consumption.

The data processing subsystem 500 is located between data sources 502 and data sinks 504. It may monitor communications along multiple paths between the data sources 502 and the data sinks 504, as well as operations of devices, such as individual data sources 502 and individual data sinks 504. Accordingly, the data processing subsystem 500 provides non-blocking communication allowing sinks 504 to only consume resources while active and, thus, reducing system overhead.

The data processing subsystem 500 includes a source discovery and ranking module 506 that includes a source discovery component 508 and source ranking component 510. A dynamic mapping module 512 includes a dynamic source-to-sink mapping component 514 and a self-healing subsystem 516. A sink discovery and ranking module 518 includes a sink discovery component 520 and a sink ranking component 522.

When the data processing subsystem 500 is operating, the source discovery component 508 may discover and identify the data sources 502. The data sources 502 may be ranked, for example, by latency, reliability, or output volume of communications, among others. Discovery of data sinks 504 may be performed by the sink discovery component 520 of the sink discovery and ranking module 518. As for the data sources 502, the data sinks 504 may be ranked, for example, by latency, reliability, or intake volume of communications, among others.

The source discovery component 508 and the sink discovery component 520 may be used by the dynamic source-to-sink mapping component 514 to map the paths between the data sources 502 and the data sinks 504. This may be performed by sending dynamic trace messages, for example, from a dynamic trace scheduling system 524.

The dynamic trace scheduling system 524 may include a time-based scheduler 526 to send payloads 528 between data sources 502 and data sinks 504 at regular intervals. The payloads 528 may include event/alert agents 530, observation agents 532, or control agents 534, among others. A trace check agent 536 may determine if a trace message has been received, for example, using a query to a data storage agent 538.

An end node absence detection module 540 may include a streaming CEP engine 542 to determine the anticipated frequency of communications returned from data sources 502 and data sinks 504. An end node frequency store agent 544 may store the frequency of communications in the time series database. A reporting and alerting system 546 may report failures in communications or devices, for example, after receiving an alert 548 from the dynamic trace scheduling system 524. The reporting and alerting system 546 may have a templating agent 552 format an alert message, for example, to be sent to an enterprise business services module 552, or an external endpoint 554, among others.

Figure 6:
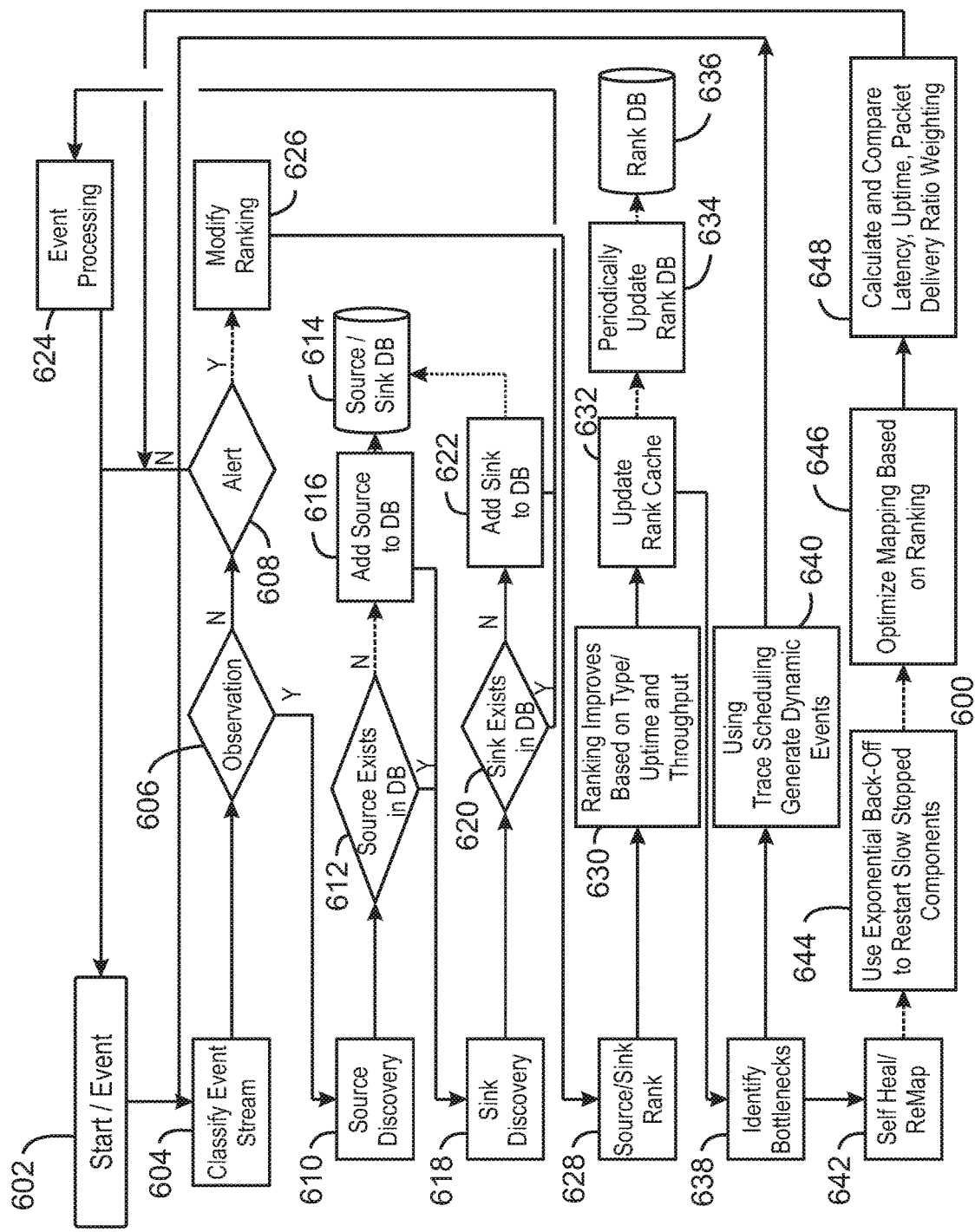
FIG. 6 is a schematic diagram of the operation of the data processing subsystem, including source/sink discovery and dynamic mapping, in accordance with some examples.

FIG. 6 is a schematic diagram of the operation 600 of the data processing subsystem 500, including source/sink discovery and dynamic mapping, in accordance with some examples. The operation 600 begins at block 602 with the occurrence of an event in an event stream. At block 604, the event is classified. If, at block 606, it is determined that the event is not an observation, then at block 608, a determination is made as to whether the event is an alert. If not, the operation 600 returns to block 602 to obtain the next event. If at block 606, it is determined that the event is an observation, process flow proceeds to block 610 to discover the source of the event. At block 612, a determination is made as to whether the source exists in the source/sink database 614. If not, at block 616, the source is added to the source/sink database 614.

Process flow then proceeds to block 618 to determine the sink for the event. At block 620, a determination is made as to whether the sink exists in the source/sink database 614. If not, at block 622, the sink is added to the source/sink database 614.

Process flow then proceeds to block 624 for event processing. The event processing at block 624 may include recording the event, forwarding the event to a final consumer, tracking the event, and the like. Once the event processing is completed at block 624, process flow returns to block 602 to obtain the next event.

If, at block 608, the event is determined to be an alert message, such as a dynamic trace message, then at block 626 the ranking may be modified. To begin, at block 628, the source or sink ranking may be re-examined and changed. At block 630 the ranking is modified based, at least in part, on type, uptime, or throughput, among others. At block 632, a cache holding the rank is updated with the rank of the sources, sinks, or both. At block 634, a rank database 636 is periodically updated from the cache. This may occur on a preset time frame, or when a certain type of event occurs, such as a communications failure to a source or sink device.

At block 638, a procedure to identify bottlenecks is implemented. At block 640, a trace scheduling system may be used to generate dynamic events, such as dynamic trace messages, which are sent to sources, for example, to be forwarded to sinks before being returned. At block 638, any current bottlenecks that have been determined from the timing of the return of the dynamic trace messages may activate a self-healing procedure at block 642.

At block 644, restart messages, or other status messages, may be sent to slowed or stopped components. The frequency between the messages may be based on the initial frequency of messages previously received from the slowed or stopped components, as determined by the CEP. If no responses are received to the restart messages, an exponential back-off procedure may be used to increase the time between the messages to allow the slowed or stopped components receiving the messages to complete an initialization procedure before receiving another message.

At block 646, the mapping between sources and sinks may be revised based on loss of communications between sources and sinks. For example, an initial path from a source to a sink may have failed due to the failure of an intermediate component, an environmental condition, or the like. A new path from the source to the sink may then be implemented to allow communications between the source and the sink to resume. At block 648, the parameters for the new path, such as latency, uptime, packet delivery ratio, may then be used to weight the new path. Process flow may then return to block 602 to obtain the next event.

Figure 7:
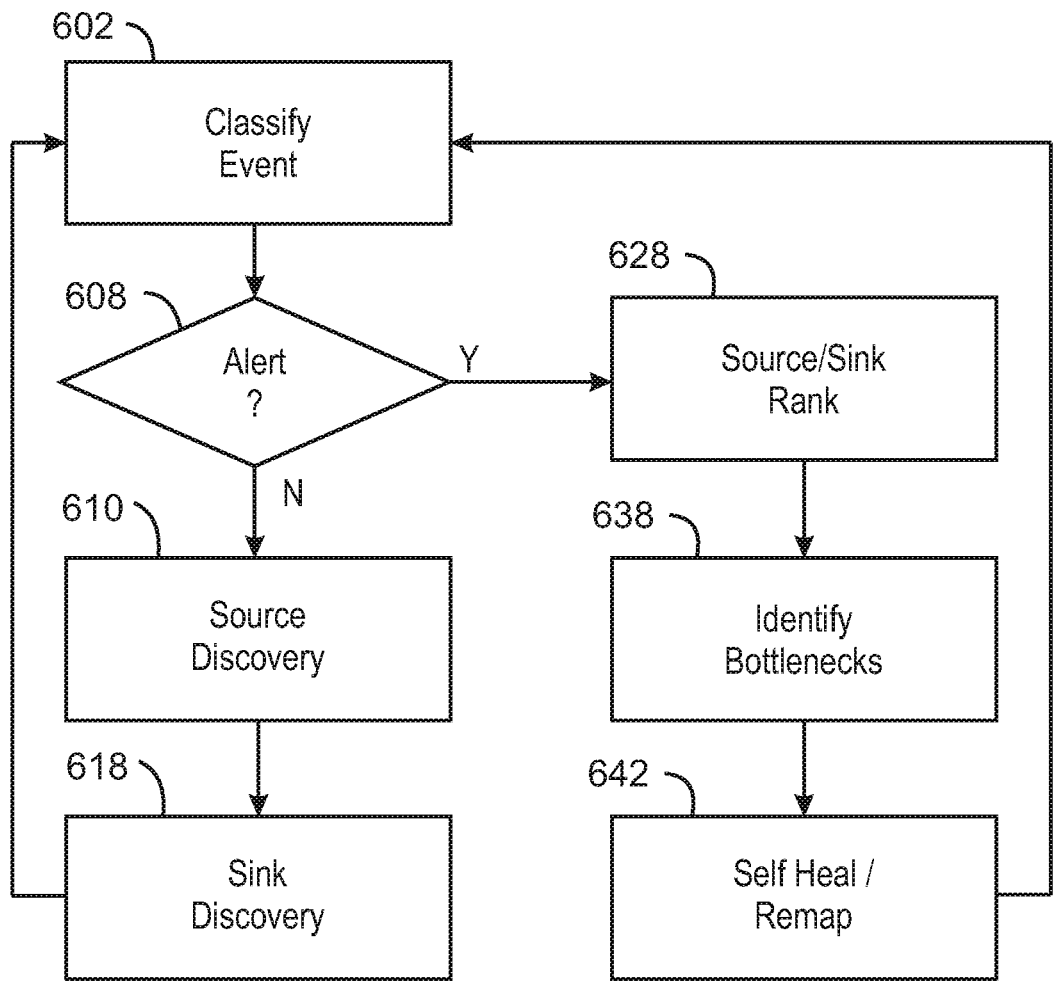
FIG. 7 is a process flow diagram of a method for the discovery of sources and sinks source, and the dynamic mapping of paths between sources and sinks, in accordance with some examples.

FIG. 7 is a process flow diagram of a method 700 for the discovery of sources and sinks source, and the dynamic mapping of paths between sources and sinks, in accordance with some examples. Like numbered items are as described with respect to FIG. 6.

Figure 8:
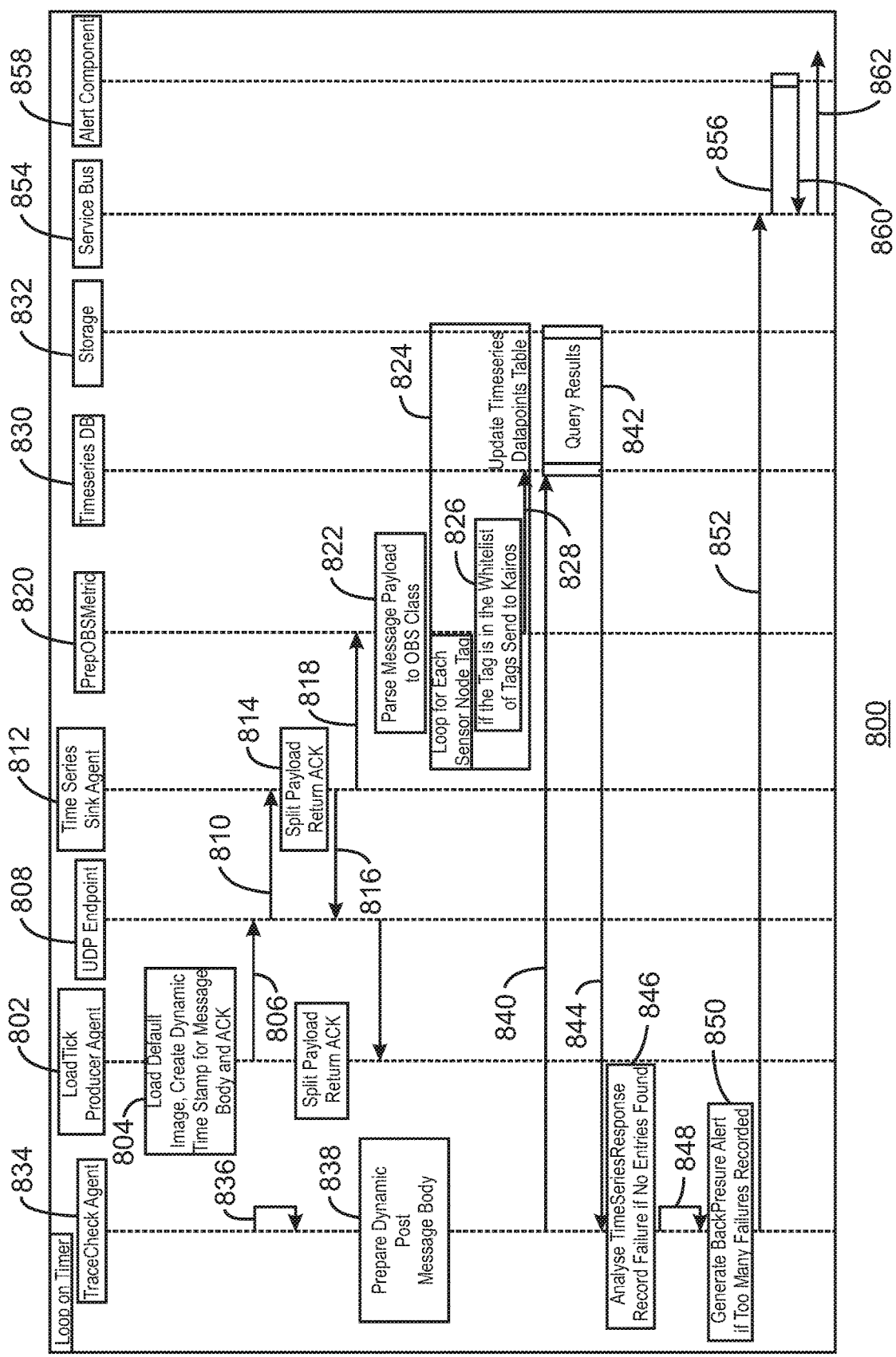
FIG. 8 is a ladder diagram of the operation of a dynamic trace scheduling sub-system, in accordance with some examples.

FIG. 8 is a ladder diagram of the operation 800 of a dynamic trace scheduling sub-system, in accordance with some examples. In the operation 800, a Loadtick producer agent 802 loads 804 a default binary payload, which may include images, to create a dynamic timestamp for a UDP/OBS (user datagram protocol/open broadcaster software) payload comprising a message body and acknowledgment. The payload is sent 806 to a UDP endpoint 808.

From the UDP endpoint 808, the payload is sent to a time-series sink agent 812. The time-series sink agent 812 splits 814 the payload into a message body and a return acknowledgment. The return acknowledgment is sent 816 back to the UDP endpoint 808, while the message body is sent 818 to a prep OBS metric module 820.

The prep OBS metric module 820 parses 822 the message payload to the OBS class, then repeats a set of sensor node tag activities 824 for each of a set of sensor or end nodes. The sensor node tag activities 824 include determining 826 if the tag is in a white list of tags, and, if so, sending 828 the tag to a time series database 830 hosted by a storage 832. The time series database 830 may be queried for messages in a time series by a trace check agent 834. The trace check agent 834 creates 836 a dynamic load, and prepares 838 a dynamic post message. In an example, the dynamic post message may have a body of the form: {"metrics":[{"tags": {"sender_ID":"TRACERESTOBS_1"[}, "name":"OBS", "aggregators":[{"name":"sum", "align_sampling":true, "sampling":{"value":1, "unit": "milliseconds"}}]}], "cache_time":0, "start_relative":{"value":62, "unit":"seconds"}}}.

The trace check agent 834 may send 840 the dynamic POST message to the timeseries database 830 which creates a query, for example, of the form "timeseries.datapoints table". A query result is generated 842 and returned 844 to the trace check agent 834. The trace check agent 834 analyzes 846 the timeseries response, and records a failure if no entries are found. The trace check agent 834 then checks 848 the failure count and generates 850 a backpressure alert if too many failures are recorded. The backpressure alert is sent 852 to a service bus 854. From the service bus 854 the backpressure alert is sent to an alert component 858 to prepare a formatted alert. The formatted alert, for example, in the form of a populated alert template, may be returned 860 to the service bus 854, and forwarded 862 from the service bus 854 on to other components.

In this example, an end-node absence detection module may confirm that end nodes have not suffered a failure preventing communication with the fog node. A light weight stream based CEP engine may be utilized. The CEP engine may provide a sliding windowed for analyzing events based on time. The sliding window may be parameterized by length and step, for example, having a length of an hour and a step of 15 minutes, providing a sliding window from 13:00 to 14:00, 13:15 to 14:15, 13:30 to 14:30, and so on. A watermarking mechanism may be used to prevent out of memory scenarios. A further example of the sliding window mechanism is discussed with respect to FIG. 9.

Figure 9:
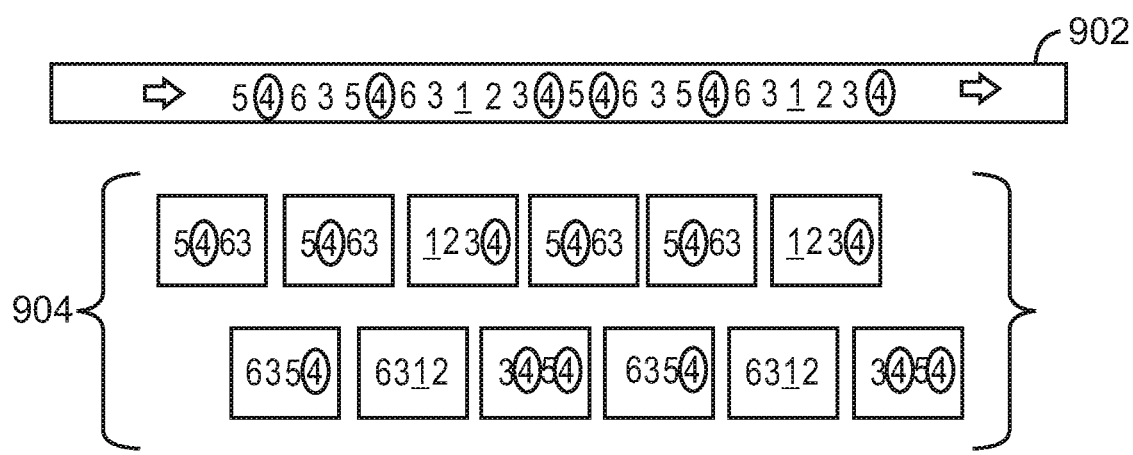
FIG. 9 is a schematic diagram of a sliding window approach, in accordance with some examples.

FIG. 9 is a schematic diagram of a sliding window approach 900, in accordance with some examples. The streaming CEP engine is initially fed, or learns from the data stream 902, the typical transmit frequency of a unique identified end node, or type of end node, depending on the detail in each event. Once the frequency is determined and in the absence of an event within the predetermined sliding window, a new event/alert is generated that can highlight the absence of an end nodes event within the expected time frame.

In this example, the data is arranged into sliding windows 904 with configurable lengths, for example, measured in units of time or number of samples, and moved in a configurable step size which may be measured in units of time, for example, five minutes, or number of samples, for example, 10,000 samples. In this example of the sliding window approach 900, the end node with ID 1 transmits on a 20-minute frequency, landing in a sliding window during every fourth five-minute window. The end node with ID 4 transmits on a five-minute frequency, landing in every sliding window. As described herein, the frequencies of the transmissions may be entered into the CEP engine, or may be determined by the CEP engine from the analysis of the data.

Figure 10:
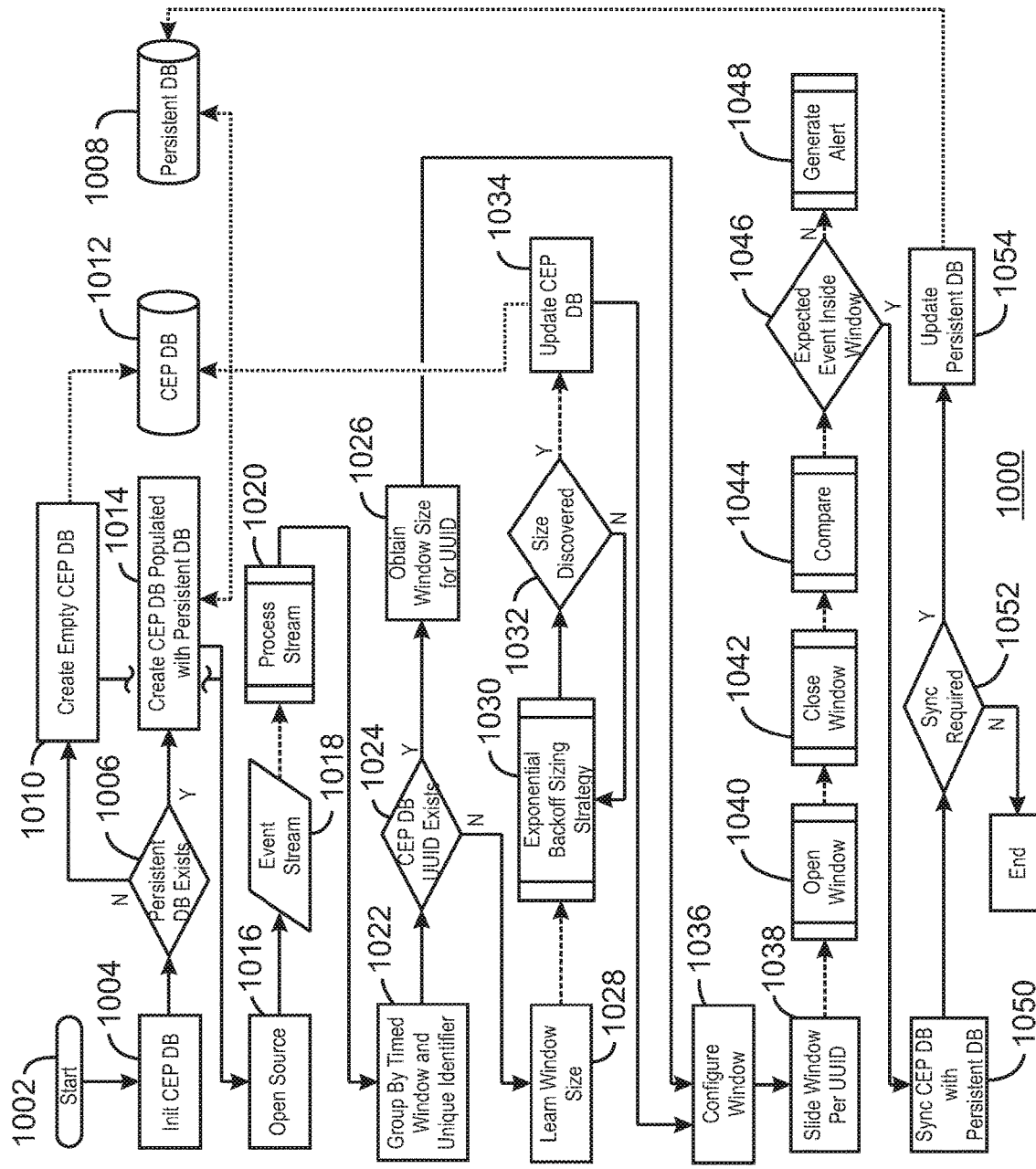
FIG. 10 is a process schematic of an operation for detecting the absence of a transmission from an end node, in accordance with examples.

FIG. 10 is a process schematic of an operation 1000 for detecting the absence of a transmission from an end node, in accordance with examples. The operation 1000 starts at block 1002. At block 1004, a CEP database is initialized. At block 1006 a determination is made as to whether a persistent database 1008 exists. If not, at block 1010 an empty CEP database 1012 is created. If, at block 1006, a determination is made that the persistent database 1008 exists, at block 1014 the CEP database 1012 is populated from the persistent database 1008.

At block 1016, the set of input sources, for example, using a TCP, UDP, or RESTful protocol, among others, is opened. At block 1018, an event stream is collected from an input source. At block 1020, the input stream is processed.

At block 1022, the input stream events are grouped by the timed window that they land in and the unique identifier for the input source. At block 1024 a determination is made as to whether an entry in the CEP database 1012 exists for the universally unique identifier (UUID) of the source. If so, at block 1026, a window size for that UUID is obtained from the CEP database 1012.

If no entry exists for the UUIDs of the source in the CEP database 1012, then at block 1028, the window size may be determined by the CEP. For example, at block 1030 an exponential back-off sizing strategy may be used, as described herein. At block 1032, a determination is made as to whether the window size has been discovered. If not, process flow returns to block 1030, to continue the determination. At block 1034, the CEP database 1012 is updated with the window size.

At block 1036, the window for the UUID is configured. At block 1038, the window for the UUID is slid by the configured step length. At block 1040, the window is opened and data is obtained for the window from the data stream. At block 1042, the window is closed. At block 1044, a comparison is made with a previous window to identify what messages have been received. At block 1046, a determination is made as to whether an expected event, or message, is in the window. If not at block 1048, an alert is generated to inform user. Other strategies may be used at this point to reactivate the device at the UUID, such as sending initialization messages to the device at the UUID.

If the expected event is inside the window at block 1046, the CEP database 1012 may be synced with the persistent database 1008. A determination is made at block 1052 as to whether the sink is required. If so, at block 1054 the persistent database 1008 is updated from the CEP database 1012. The operation 1000 ends at block 1056.

FIG. 11 is a screen shot of a real-time visualization 1100 of endpoint status, in accordance with some examples. The visualization 1100 shows the status of the endpoint at a number of different times, and may reflects transmission checks, failures, successes, attempts, and the like. As described herein, details in relation to the historical metadata of the system may be captured in the time series database or other datastore for further analysis. Further, the historical metadata may be visualized as shown in FIG. 12.

Figure 12:
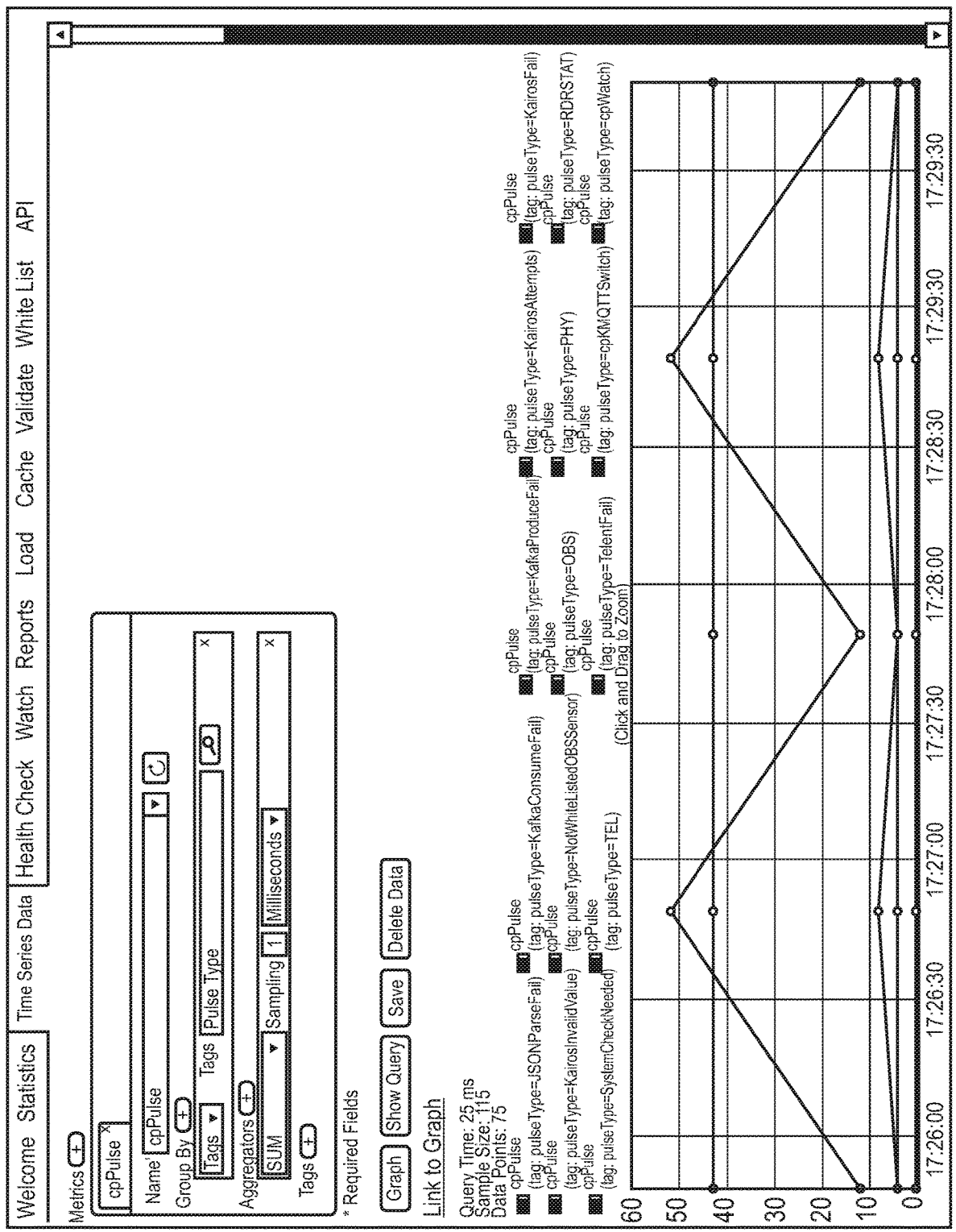
FIG. 12 is a screen shot of a historical time analysis visualization, in accordance with some examples.

FIG. 12 is a screen shot of a historical time analysis visualization 1200, in accordance with some examples. In the visualization 1200, the status of endpoints may be shown graphically, indicating the amount of data sent, the amount of data accepted, the latency, and the like.

Figure 13:
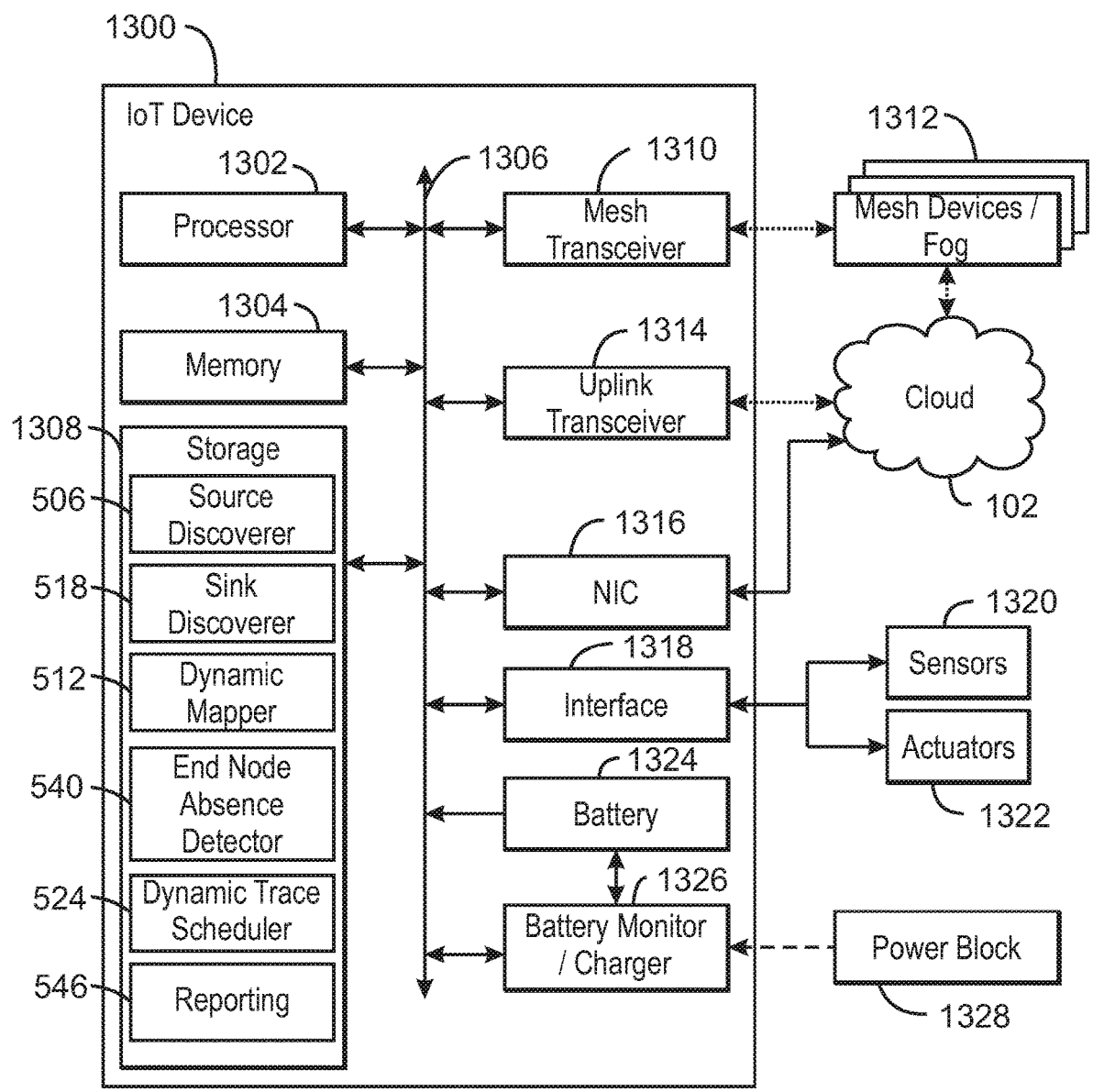
FIG. 13 is a block diagram of a system for self-adjusting data processing in fog networks, in accordance with embodiments.

FIG. 13 is a block diagram of a system 1300 for self-adjusting data processing in fog networks, in accordance with embodiments. Like numbered items are as described with respect to FIGS. 1 and 5. The IoT device 1300 may include any combinations of the components shown in the example. The components may be implemented as ICs, portions thereof, discrete electronic devices, or other modules, logic, hardware, software, firmware, or a combination thereof adapted in the IoT device 1300, or as components otherwise incorporated within a chassis of a larger system. The block diagram of FIG. 13 is intended to show a high-level view of components of the IoT device 1300. However, some of the components shown may be omitted, additional components may be present, and different arrangement of the components shown may occur in other implementations.

The IoT device 1300 may include a processor 1302, which may be a microprocessor, a multi-core processor, a multithreaded processor, an ultra-low voltage processor, an embedded processor, or other known processing element. The processor 1302 may be a part of a system on a chip (SoC) in which the processor 1302 and other components are formed into a single integrated circuit, or a single package, such as the Edison™ or Galileo™ SoC boards from Intel. As an example, the processor 1302 may include an Intel® Architecture Core™ based processor, such as a Quark™, an Atom™, an i3, an i5, an i7, a Xeon®, a Xeon Phi™ co-processor, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 1302 may communicate with a system memory 1304 over a bus 1306. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 1308 may also be coupled to the processor 1302 via the bus 1306. To enable a thinner and lighter system design, the mass storage 1308 may be implemented via a solid-state drive (SSD). Other devices that may be used for the mass storage 1308 include flash memory cards, such as SD cards, microSD cards, xD picture cards, and the like, and USB flash drives.

In low power implementations, the mass storage 1308 may be on-die memory or registers associated with the processor 1302. However, in some examples, the mass storage 1308 may be implemented using a micro hard disk drive (HDD). Further, any number of new technologies may be used for the mass storage 1308 in addition to, or instead of, the technologies described, such resistance change memories, phase change memories, holographic memories, or chemical memories, among others. For example, the IoT device 1300 may incorporate the 3D XPOINT memories from Intel® and Micron®.

The components may communicate over the bus 1306. The bus 1306 may include any number of technologies, including industry standard architecture (ISA), extended ISA (EISA), peripheral component interconnect (PCI), peripheral component interconnect extended (PCIx), PCI express (PCIe), or any number of other technologies. The bus 1306 may be a proprietary bus, for example, used in a SoC based system. Other bus systems may be included, such as an I²C interface, I³C interface, an SPI interface, point to point interfaces, and a power bus, among others.

The bus 1306 may couple the processor 1302 to a mesh transceiver 1310, for communications with other mesh or local devices 1312. The mesh transceiver 1310 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1312. For example, a WLAN unit may be used to implement WiFi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 1310 may communicate using multiple standards or radios for communications at different range. For example, the IoT device 1300 may communicate with geographically proximate devices, e.g., within about 10 meters, using a local transceiver based on BLE, or another low power radio, to save power. More distant mesh devices 1312, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 1310 may be incorporated into an MCU as an address directly accessible by the chip, such as in the Curie® units available from Intel.

An uplink transceiver 1314 may be included to communicate with devices at further ranges, such as in the cloud 102. The uplink transceiver 1314 may be LPWA transceiver that follows the IEEE 802.15.4, IEEE 802.15.4g, IEEE 802.15.4e, IEEE 802.15.4k, or NB-IoT standards, among others. The IoT device 1300 may communicate over a wide area using LoRaWAN™ (Long Range Wide Area Network) developed by Semtech and the LoRa Alliance. The techniques described herein are not limited to these technologies, but may be used with any number of other transceivers that implement long range, low and medium bandwidth communications, such as Sigfox, Weightless-P from the Weightless Special Interest Group, Random Phase Multiple Access (RPMA®) from Ingenu, and other technologies. Further, other communications techniques, such as LTE Release 8 and later revisions, in addition to LTE D2D ProSe, from the 3rd Generation Partnership Project (3GPP), IEEE 802.11p DSRC, and time-slotted channel hopping, described in the IEEE 802.15.4e specification may be used.

Any number of other radio communications and protocols may be used in addition to the systems mentioned for the mesh transceiver 1310 and uplink transceiver 1314, as described herein. For example, the radio transceivers 1310 and 1314 may include an LTE or other cellular transceiver that uses spread spectrum (SPA/SAS) communications for implementing high-speed communications, such as for video transfers.

The radio transceivers 1310 and 1314 may include radios that are compatible with any number of 3GPP (Third Generation Partnership Project) specifications, notably Long Term Evolution (LTE), Long Term Evolution-Advanced (LTE-A), Long Term Evolution-Advanced Pro (LTE-A Pro), LTE D2D ProSe, Narrow Band IoT (NB-IoT), and IEEE 802.11p DSRC, among others. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), LTE D2D ProSe, Narrow Band IoT (NB-IoT), IEEE 802.11p DSRC, CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High-speed Packet Access), HSDPA (High-Speed Downlink Packet Access), HSUPA (High-Speed Uplink Packet Access), HSPA+(High-speed Packet Access Plus), UMTS-TDD (Universal Mobile Telecommunications System—Time-Division Duplex), TD-CDMA (Time Division—Code Division Multiple Access), TD-SCDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 1314, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

The transceivers 1310 and 1314 may be used to provide communications between the IoT device 1300 and an MEC network. The MEC network may efficiently provide the reliability services described herein, such as the determination of missing messages, failed devices, source-to-sink mapping, device and path ranking, and the like. For example, the data processing subsystem 500, described with respect to FIG. 5, may be implemented in an MEC network.

A network interface controller (NIC) 1316 may be included to provide a wired communication to the cloud 102 or to other devices, such as the mesh devices 1312. The wired communication may provide an Ethernet connection, or may be based on other types of networks, such as Controller Area Network (CAN), Local Interconnect Network (LIN), DeviceNet, ControlNet, Data Highway+, EtherCAT, SERCOS, PROFIBUS, PROFINET RT, or PROFINET IRT, among many others. An additional NIC 1316 may be included to allow connect to a second network, for example, a NIC 1316 providing communications to the cloud over Ethernet, and a second NIC 1316 providing communications to other devices over another type of network.

The bus 1306 may couple the processor 1302 to an interface 1318 that is used to connect external devices. The external devices may include sensors 1320, such as accelerometers, level sensors, flow sensors, temperature sensors, pressure sensors, barometric pressure sensors, touch inputs on a touch screen, and the like. The interface 1318 may be used to connect the IoT device 1300 to actuators 1322, including displays, such as power switches, valve actuators, an audible sound generator, a visual warning device, a screen or monitor, and the like.

While not shown, various input/output (I/O) devices may be present within, or connected to, the IoT device 1300. For example, a display may be included to show information, such as sensor readings or actuator position. An input device, such as a touch screen or keypad may be included to accept input.

A battery 1324 may power the IoT device 1300, although in examples in which the IoT device 1300 is mounted in a fixed location, it may have a power supply coupled to an electrical grid. The battery 1324 may be a lithium ion battery, a metal-air battery, such as a zinc-air battery, an aluminum-air battery, a lithium-air battery, a hybrid supercapacitor, and the like.

A battery monitor/charger 1326 may be included in the IoT device 1300 to track the state of charge (SoCh) of the battery 1320. The battery monitor/charger 1326 may be used to monitor other parameters of the battery 1324 to provide failure predictions, such as the state of health (SoH) and the state of function (SoF) of the battery 1324. The battery monitor/charger 1326 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1326 may communicate the information on the battery 1324 to the processor 1302 over the bus 1306. The battery monitor/charger 1326 may also include an analog-to-digital (ADC) convertor that allows the processor 1302 to directly monitor the voltage of the battery 1326 or the current flow from the battery 1324. The battery parameters may be used to determine actions that the IoT device 1300 may perform, such as transmission frequency, mesh network operation, sensing frequency, and the like.

A power block 1328, or other power supply coupled to a grid, may be coupled with the battery monitor/charger 1326 to charge the battery 1324. In some examples, the power block 1328 may be replaced with a wireless power receiver to obtain the power wirelessly, for example, through a loop antenna in the IoT device 1300. A wireless battery charging circuit, such as an LTC4020 chip from Linear Technologies of Milpitas, Calif., among others, may be included in the battery monitor/charger 1326. The specific charging circuits chosen may depend on the size of the battery 1324, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others. In some examples, the power block 1328 may be augmented or replaced with solar panels, a wind generator, a water generator, or other natural power systems.

The mass storage 1308 may include a number of modules to implement the network adaptation functions described herein. Although shown as code blocks in the mass storage 1308, it may be understood that any of the modules may be fully or partially replaced with hardwired circuits, for example, built into an application specific integrated circuit (ASIC). The code blocks may be as described with respect to FIG. 5.

Figure 14:
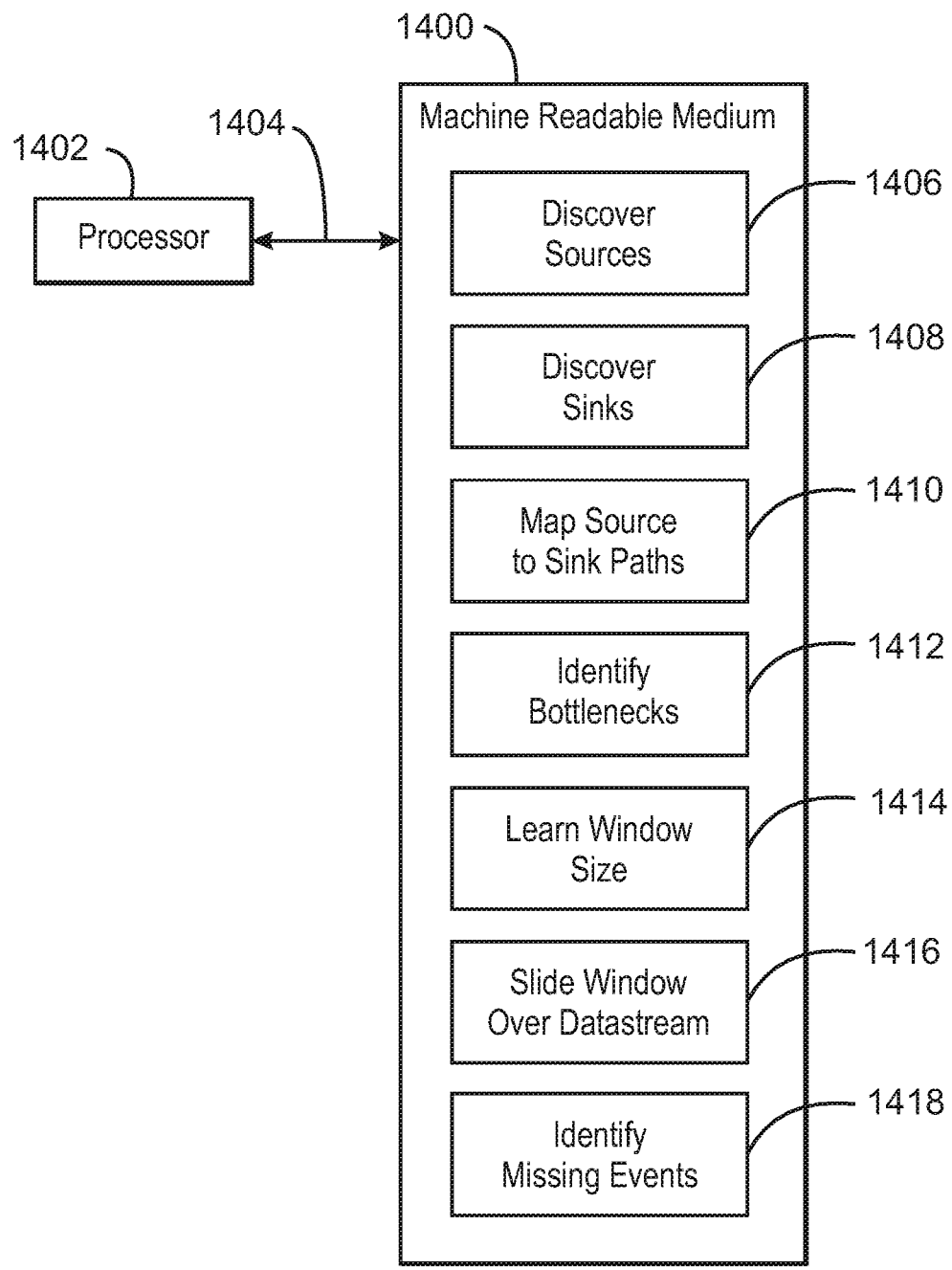
FIG. 14 is a block diagram of a non-transitory, machine readable medium including code blocks that, when executed, directs a processor to implement a self-adjusting data processing method, in accordance with examples.

FIG. 14 is a block diagram of a non-transitory, machine readable medium 1400 including code blocks that, when executed, directs a processor to implement a self-adjusting data processing method, in accordance with examples. The processor 1402 may access the non-transitory, machine readable medium 1400 over a bus 1404. The processor 1402 and bus 1404 may be selected as described with respect to the processor 1302 and bus 1306 of FIG. 13. The non-transitory, machine readable medium 1300 may include devices described for the mass storage 1308 of FIG. 13 or may include optical disks, thumb drives, or any number of other hardware devices.

The non-transitory, machine readable medium 1400 may include code 1406 to direct the processor 1402 to discover data sources, for example, as described with respect to FIGS. 5 and 6. Code 1408 may be included to direct the processor 1402 to discover data sinks, for example, as described with respect to FIGS. 5 and 6. Code 1410 may be included to direct the processor 1402 to map has between data sources and data sinks, for example, as described with respect to FIGS. 5 and 6.

The non-transitory, machine readable medium 1400 may include code 1412 to direct the processor 1402 to identify bottlenecks in communications or failed paths or devices, for example, as described with respect to FIGS. 5 to 10. Code 1414 may be included to direct the processor 1402 to learn a window size for a time window in which communications are expected from a device, for example, as described with respect to FIGS. 8 to 10. Code 1416 may be included to direct the processor 1402 to slide the time window across the data stream to determine which observations are within the time window, for example, as described with respect to FIGS. 9 and 10. Code 1418 may be included to direct the processor 1402 to identify missing events from the data stream, for example, based on a time window as described with respect to FIG. 10.

EXAMPLES

Example 1 includes an apparatus for self-adjusting processing for internet of things (IoT) devices, including a source discovery system configured to identify if a source sending a message is in a database, and, if not, add the source to the database, and rank the source by link metrics of messages received from the source. A sink discovery system is configured to identify if a sink receiving a message is in a database, and, if not, add the sink to the database, and rank the sink by link metrics of messages responded to by the sink. A dynamic mapping system is configured to create a dynamic map of communications between a source and a sink, and implement a self-healing subsystem to restore a loss of communications between a source and a sink.

Example 2 includes the subject matter of example 1. In this example, the link metrics include packet delivery ratios, uptime, or latency, or any combinations thereof.

Example 3 includes the subject matter of either of examples 1 or 2. In this example, the apparatus includes an end node absence detector configure to detect a lack of communications from an end node within a window of time.

Example 4 includes the subject matter of any of examples 1 to 3. In this example, an end node absence detector includes a complex event processing engine configured to determine a window of time during which a transmission from a source is expected.

Example 5 includes the subject matter of any of examples 1 to 4. In this example, the apparatus includes an alerting system to signal when an expected communication from a source is not received within a window of time.

Example 6 includes the subject matter of any of examples 1 to 5. In this example, the apparatus includes a dynamic trace scheduling system including a time-based scheduler configured to send a trace message in a reoccurring window of time.

Example 7 includes the subject matter of any of examples 1 to 6. In this example, the apparatus includes a fog node communicatively coupled to a number of internet-of-things devices.

Example 8 includes a method for adjusting data processing in a in a computing cloud, including creating an alert message including a virtual payload, sending the alert message to a source at a regular interval, and tracing the alert message through the computing cloud as it progresses to a sink. The method includes determining if the alert message is received in a time window and performing a self-healing operation if the alert message is not received in the time window.

Example 9 includes the subject matter of example 8. In this example, the method includes determining if a source of an observation message is in a database and adding the source to the database if the source is not in the database.

Example 10 includes the subject matter of either of examples 8 or 9. In this example, the method includes determining if a sink for an observation message is in a database and adding the sink to the database if the sink is not in the database.

Example 11 includes the subject matter of any of examples 8 to 10. In this example, the method includes mapping paths from source to sink as the alert message is sent between devices.

Example 12 includes the subject matter of any of examples 8 to 11. In this example, the method includes ranking paths from a source to a sink based on link metrics.

Example 13 includes the subject matter of any of examples 8 to 12. In this example, link metrics include packet delivery ratios, uptime, or latency, or any combinations thereof.

Example 14 includes the subject matter of any of examples 8 to 13. In this example, a self-healing operation includes selecting a new path for communications between source and sink.

Example 15 includes the subject matter of any of examples 8 to 14. In this example, a self-healing operation includes restarting devices using an exponential back-off technique.

Example 16 includes the subject matter of any of examples 8 to 15. In this example, the method includes creating a complex event processing (CEP) database.

Example 17 includes the subject matter of any of examples 8 to 16. In this example, the method includes synching a complex event processing (CEP) database with a persistent database.

Example 18 includes the subject matter of any of examples 8 to 17. In this example, the method includes learning a size for a time window for alert messages received using an exponential back-off technique.

Example 19 includes the subject matter of any of examples 8 to 18. In this example, the method includes sliding the time window for a device, opening events within the time window, closing the events within the time window, and determining if an expected event is within the time window.

Example 20 includes the subject matter of any of examples 8 to 19. In this example, the method includes generating an alert if an expected event is not within the time window.

Example 21 includes a non-transitory, machine readable medium including code that, when executed, directs a processor to rank a path from a source to a sink and create a dynamic source to sink mapping.

Example 22 includes the subject matter of example 21. In this example, the non-transitory, computer readable medium includes code that, when executed, directs the processor to detect an absence of a message from a device and activate a self-healing technique.

Example 23 includes the subject matter of either of examples 21 or 22. In this example, the non-transitory, computer readable medium code that, when executed, directs the processor to send a trace message to device, and track the path from the source to the sink.

Example 24 includes the subject matter of any of examples 21 to 23. In this example, the non-transitory, computer readable medium includes code that, when executed, directs the processor to discover a source based, at least in part, on messages sent from the source and add the source to a database.

Example 25 includes the subject matter of any of examples 21 to 24. In this example, the non-transitory, computer readable medium includes code that, when executed, directs the processor to discover a sink based, at least in part, on messages sent from the sink and add the sink to a database.

Example 26 includes an apparatus for self-adjusting processing for internet of things (IoT) devices. The apparatus includes a source discovery system configured to identify if a source sending a message is in a database, and, if not, add the source to the database, and rank the source by link metrics of messages received from the source. A sink discovery system is configured to identify if a sink receiving a message is in a database, and, if not, add the sink to the database, and rank the sink by link metrics of messages responded to by the sink. The apparatus includes a means to self-heal a loss of communications between the source and the sink.

Example 27 includes the subject matter of example 26. In this example, the apparatus includes a means to detect a loss of communications from an end node.

Example 28 includes the subject matter of either of examples 26 or 27. In this example, the apparatus includes a means to determine a time window during which the message is expected.

Example 29 includes the subject matter of any of examples 26 to 28. In this example, the apparatus includes a means to alert a user when the message does not arrive within an expected time window.

Example 30 includes the subject matter of any of examples 26 to 29. In this example, the apparatus includes a means to map a number of paths between a data source and a data sink.

Example 31 includes a non-transitory, machine readable medium including instructions that, when executed, directs a processor in a node to perform any one of the methods of examples 38 to 50.

Example 32 includes an apparatus that includes means to perform any one of the methods of examples 38 to 50.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. An apparatus for self-adjusting processing for internet of things (IoT) devices, comprising:
   a processor; and
   storage to store code, wherein the code, when executed, is to direct the processor to:
   identify if a source sending a message is in a database, and, if not, add the source to the database;
   rank the source by link metrics of messages received from the source;
   identify if a sink receiving a message is in a database, and, if not, add the sink to the database;
   rank the sink by link metrics of messages responded to by the sink;
   create a dynamic map of communications between a source and a sink; and
   implement self-healing to restore a loss of communications between a source and a sink.

2. The apparatus of claim 1, wherein the link metrics comprise packet delivery ratios, uptime, or latency, or any combinations thereof.

3. The apparatus of claim 1, wherein the storage is to store code, wherein the code, when executed, is to direct the processor to detect a lack of communications from an end node within a window of time.

4. The apparatus of claim 3, wherein the storage is to store code, wherein the code, when executed, is to direct the processor to determine a window of time during which a transmission from a source is expected.

5. The apparatus of claim 1, wherein the storage is to store code, wherein the code, when executed, is to direct the processor to signal when an expected communication from a source is not received within a window of time.

6. The apparatus of claim 1, wherein the storage is to store code, wherein the code, when executed, is to direct the processor to send a trace message in a reoccurring window of time.

7. The apparatus of claim 1, comprising a fog node communicatively coupled to a plurality of internet-of-things devices.

8. A non-transitory, computer readable medium comprising code that, when executed, directs a processor to:
   identify if a source sending a message is in a database, and, if not, add the source to the database; and
   rank the source by link metrics of messages received from the source.

9. The non-transitory, computer readable medium of claim 8, comprising code that, when executed, directs the processor to:
   identify if a sink receiving a message is in a database, and, if not, add the sink to the database; and
   rank the sink by link metrics of messages responded to by the sink.

10. The non-transitory, computer readable medium of claim 9, comprising code that, when executed, directs the processor to:
    create a dynamic map of communications between a source and a sink; and
    implement self-healing to restore a loss of communications between a source and a sink.

11. The non-transitory, computer readable medium of claim 8, wherein the link metrics comprise packet delivery ratios, uptime, or latency, or any combinations thereof.

12. The non-transitory, computer readable medium of claim 8, comprising code that, when executed, directs the processor to detect a lack of communications from an end node within a window of time.

13. The non-transitory, computer readable medium of claim 12, comprising code that, when executed, directs the processor to determine a window of time during which a transmission from a source is expected.

14. The non-transitory, computer readable medium of claim 8, comprising code that, when executed, directs the processor to signal when an expected communication from a source is not received within a window of time.

15. The non-transitory, computer readable medium of claim 8, comprising code that, when executed, directs the processor to send a trace message in a reoccurring window of time.

16. The non-transitory, computer readable medium of claim 8, comprising code that, when executed, directs the processor to:
    rank a path from a source to a sink; and
    create a dynamic source to sink mapping.

17. The non-transitory, computer readable medium of claim 16, comprising code that, when executed, directs the processor to:
    detect an absence of a message from a device; and
    activate a self-healing technique.

18. The non-transitory, computer readable medium of claim 16, comprising code that, when executed, directs the processor to:
    send a trace message to device; and
    track the path from the source to the sink.

19. The non-transitory, computer readable medium of claim 16, comprising code that, when executed, directs the processor to:
- discover a source based, at least in part, on messages sent from the source; and
- add the source to a database.

20. The non-transitory, computer readable medium of claim 16, comprising code that, when executed, directs the processor to:
- discover a sink based, at least in part, on messages sent from the sink; and
- add the sink to a database.

21. A method for self-adjusting processing for internet of things (IoT) devices, comprising:
- identifying if a source sending a message is in a database, and, if not, add the source to the database;
- ranking the source by link metrics of messages received from the source;
- identifying if a sink receiving a message is in a database, and, if not, add the sink to the database;
- ranking the sink by link metrics of messages responded to by the sink;
- creating a dynamic map of communications between a source and a sink; and
- restoring a loss of communications between a source and a sink.

22. The method of claim 21, comprising detecting a lack of communications from an end node within a window of time.

23. The method of claim 22, comprising determining a window of time during which a transmission from a source is expected.

24. The method of claim 21, comprising signaling when an expected communication from a source is not received within a window of time.

25. The method of claim 21, comprising sending a trace message in a reoccurring window of time.

* * * * *